(12) United States Patent
Merritt

(10) Patent No.: US 11,224,257 B2
(45) Date of Patent: Jan. 18, 2022

(54) PAJAMAS AND BLANKET HAVING RELEASABLY ATTACHED 3-D ILLUMINATED STUFFED ANIMALS

(71) Applicant: Alyse Nicole Merritt, Land O Lakes, FL (US)

(72) Inventor: Alyse Nicole Merritt, Land O Lakes, FL (US)

(*) Notice: Subject to any disclaimer, the term of this patent is extended or adjusted under 35 U.S.C. 154(b) by 134 days.

(21) Appl. No.: 16/267,371

(22) Filed: Feb. 4, 2019

(65) Prior Publication Data
US 2019/0269186 A1    Sep. 5, 2019

Related U.S. Application Data

(63) Continuation-in-part of application No. 16/006,829, filed on Jun. 12, 2018, now abandoned, which is a continuation-in-part of application No. 15/909,604, filed on Mar. 1, 2018, now abandoned.

(51) Int. Cl.
| | |
|---|---|
| *A41D 27/08* | (2006.01) |
| *G09B 19/00* | (2006.01) |
| *A41D 10/00* | (2006.01) |
| *G09B 1/32* | (2006.01) |
| *G09B 1/02* | (2006.01) |
| *A41D 11/00* | (2006.01) |

(52) U.S. Cl.
CPC .......... *A41D 27/085* (2013.01); *A41D 10/00* (2013.01); *A41D 11/00* (2013.01); *G09B 1/02* (2013.01); *G09B 1/32* (2013.01); *G09B 19/00* (2013.01)

(58) Field of Classification Search
CPC ....... A41D 27/085; A41D 10/10; A41D 11/00
USPC .................................................. 2/83
See application file for complete search history.

(56) References Cited

U.S. PATENT DOCUMENTS

| | | | | |
|---|---|---|---|---|
| 4,543,669 A * | 10/1985 | Katz | ...... | A41D 11/00 2/84 |
| 4,860,387 A * | 8/1989 | Williams | ...... | A41D 27/08 2/244 |
| 5,007,113 A * | 4/1991 | Bouadjadja | ...... | A41D 15/04 2/106 |
| 5,169,701 A * | 12/1992 | Sander | ...... | A41D 27/08 428/542.2 |
| 5,542,122 A * | 8/1996 | Moldovan | ...... | A41D 27/08 2/115 |
| 5,823,851 A * | 10/1998 | Dicker | ...... | A41C 3/0057 450/2 |
| 6,233,763 B1 * | 5/2001 | Spaan | ...... | A47G 9/0207 446/72 |
| 6,279,167 B1 * | 8/2001 | Johnson | ...... | A42B 1/004 2/209.11 |
| 7,278,758 B2 * | 10/2007 | Esses | ...... | A41D 1/04 362/103 |
| 9,573,073 B1 * | 2/2017 | Mazur | ...... | A63H 33/004 |
| 2001/0031605 A1 * | 10/2001 | Kondo | ...... | A63H 3/003 446/484 |
| 2005/0101220 A1 * | 5/2005 | Jackson | ...... | A63H 3/003 446/369 |
| 2005/0125874 A1 * | 6/2005 | DeVore | ...... | A41D 13/01 2/69 |
| 2008/0019120 A1 * | 1/2008 | Rapisarda | ...... | H05K 3/325 362/103 |

(Continued)

*Primary Examiner* — Gloria M Hale
(74) *Attorney, Agent, or Firm* — Zagrebelsky Law P.A.; Robert Varkonyi

(57) ABSTRACT

Pajamas and blanket having releasably attached 3-d illuminated stuffed animals are described.

10 Claims, 24 Drawing Sheets

(56) References Cited

U.S. PATENT DOCUMENTS

| | | | | |
|---|---|---|---|---|
| 2010/0058510 A1* | 3/2010 | Vithlani | .............. | A41D 27/08 |
| | | | | 2/69 |
| 2011/0162124 A1* | 7/2011 | Cosentino | .............. | D06Q 1/00 |
| | | | | 2/93 |
| 2012/0329358 A1* | 12/2012 | Cupid | .............. | A63H 3/005 |
| | | | | 446/73 |
| 2013/0077289 A1* | 3/2013 | Gridley | .............. | A41D 27/085 |
| | | | | 362/103 |
| 2013/0085040 A1* | 4/2013 | Bowers | .............. | A63B 21/0552 |
| | | | | 482/8 |
| 2013/0125286 A1* | 5/2013 | Roberts | .............. | A41D 27/08 |
| | | | | 2/69 |
| 2014/0082817 A1* | 3/2014 | Kempe | .............. | A45F 5/02 |
| | | | | 2/69 |
| 2014/0347845 A1* | 11/2014 | Pulido, Jr. | .............. | A43B 3/001 |
| | | | | 362/103 |
| 2014/0354153 A1* | 12/2014 | Pulido, Jr. | .............. | F21V 33/0008 |
| | | | | 315/77 |
| 2014/0376209 A1* | 12/2014 | Leung | .............. | F21V 33/004 |
| | | | | 362/103 |
| 2015/0016093 A1* | 1/2015 | Wilson | .............. | F21V 33/0008 |
| | | | | 362/103 |
| 2015/0101100 A1* | 4/2015 | Flowers | .............. | A41B 13/06 |
| | | | | 2/69.5 |
| 2015/0250043 A1* | 9/2015 | Timmerberg | .............. | A41D 13/01 |
| | | | | 315/153 |
| 2015/0320125 A1* | 11/2015 | Opperman | .............. | A41D 11/00 |
| | | | | 446/28 |
| 2017/0055612 A1* | 3/2017 | Francis, II | .............. | A41B 13/005 |
| 2018/0271441 A1* | 9/2018 | Dabby | .............. | A41D 1/005 |
| 2018/0304800 A1* | 10/2018 | Thompson | .............. | B60Q 1/36 |

* cited by examiner

FIG. 2A
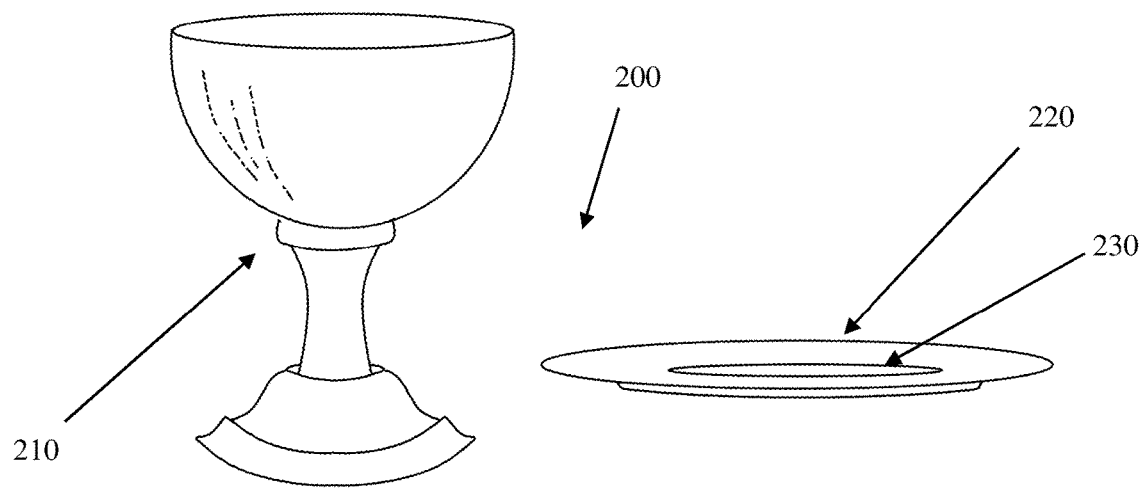
FIG. 2C
FIG. 2B
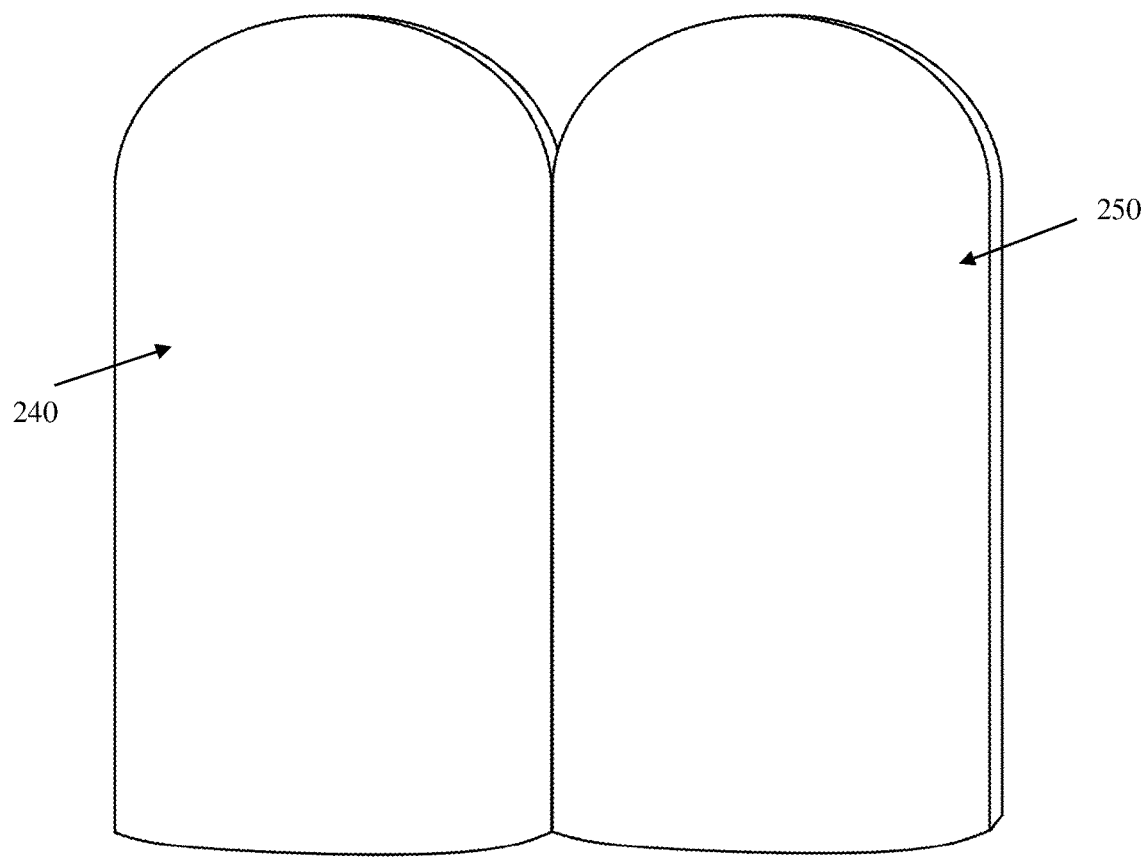

FIG. 10A
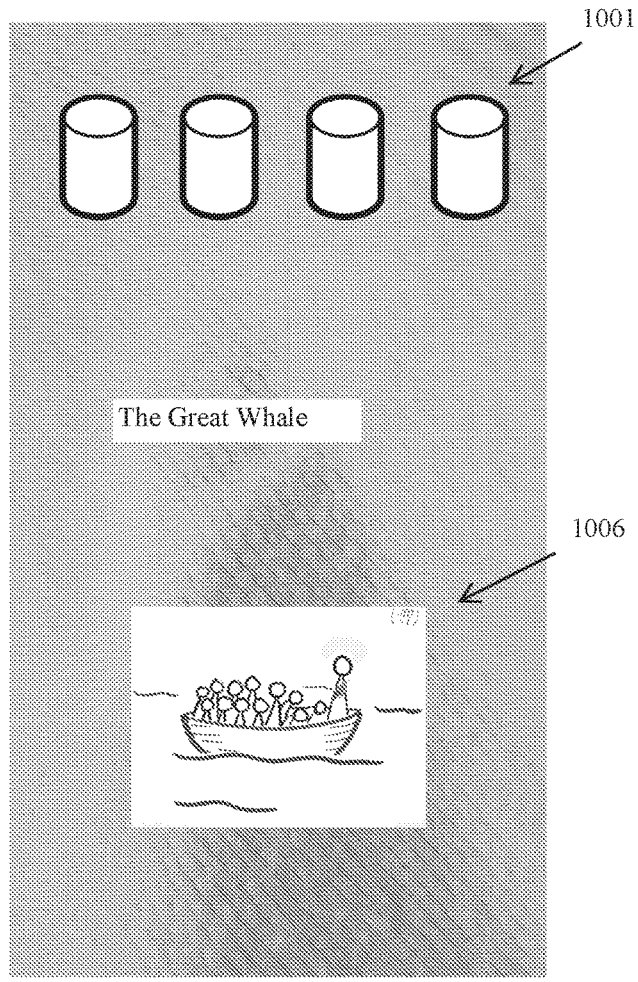
FIG. 10C
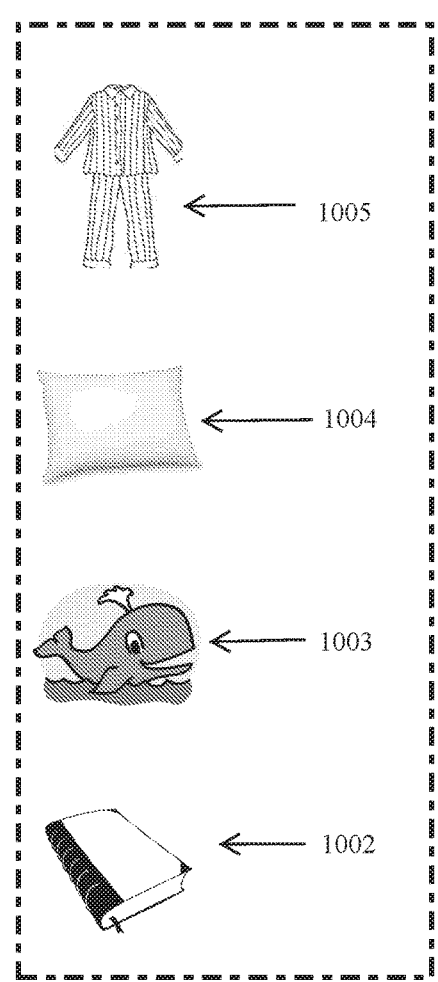
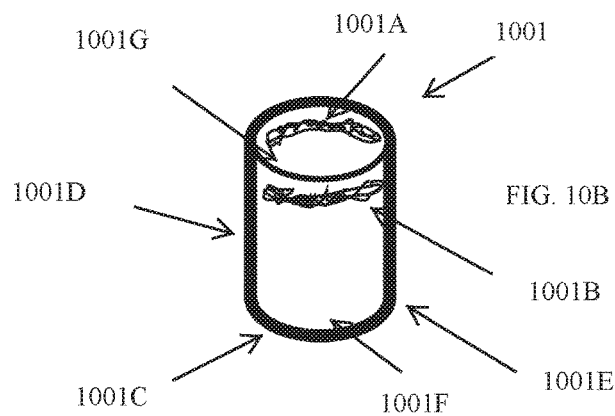
FIG. 10B

PAJAMAS AND BLANKET HAVING RELEASABLY ATTACHED 3-D ILLUMINATED STUFFED ANIMALS

CROSS REFERENCE TO RELATED APPLICATIONS

This application is a continuation-in-part of U.S. application Ser. No. 15/909,604, entitled "Instructive Clothing & Accessories and Method for their Creation and Use", and filed on Mar. 1, 2018, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or patent disclosure as it appears in the United States Patent and Trademark Office patent file or records, but otherwise reserves all copyrights whatsoever.

BACKGROUND

Field of the Invention

Relating to improvements in the method of the manufacture for various wearable items. More specifically, relating to pajamas and blanket having releasably attached 3-D illuminated stuffed animals and/or shapes.

Clothing has been utilized in the past to provide warmth, cover extremities to avoid the inappropriate display of the body and for purely decorative purposes. However, clothing has not been used before to foster an educational purpose. Additionally, there are no current mechanisms to target a younger audience that assists parents in teaching moral behavior that can touch the hearts and minds of young people. Further, a bedroom set is a general play area for children and they need to feel welcome and organized. However, the child's room can be a dark and dreary place that does not lend itself to having a great deal of storage space. Also, children do not readily cooperate with parents in maintaining a clean and organized space. Finally, a bedroom set does not lend itself to easily holding the attention of children as they do not have items with which to interact. Thus, there needs to be solutions to overcome this deficiencies.

BRIEF SUMMARY OF THE INVENTION

In a first aspect, an article of clothing having an imprinted text that is redacted, paraphrased, copied exactly or combinations of the foregoing. The text is from a literary work such as the Bible but can be taken from other literary works.

In a second aspect, an accessory is chosen representative of a story from the Bible or other literary work. It is created using manual or computerized manufacturing techniques.

In another aspect, a process is described having the steps of choosing a story, manipulating the text of the story, choosing an accessory indicative of the story and printing the manipulated text on an article of clothing and creation of the accessory.

In another aspect, a lighting device is included as part of the learning process; the lighting device is optionally attached to the sleeve of the pajama or other part thereof.

BRIEF DESCRIPTION OF THE SEVERAL VIEWS OF THE DRAWINGS

FIG. 1A illustrates a unisex article of clothing having religious imagery and a printed passage from the Bible in an embodiment taught herein. FIG. 1B illustrates how a typically feminine article of clothing educates young girls about religion in an embodiment taught herein.

FIG. 2A, 2B, 2C illustrates an embodiment of accessories created in combination with the religiously oriented clothing of FIG. 1. FIG. 2A illustrates a communion chalice, whilst FIG. 2C shows a paten and host utilized as accessories teaching youngsters about their religious beliefs in an embodiment taught herein. FIG. 2B illustrates two tablets of the Ten Commandments teaching youngsters about their religious beliefs in an embodiment taught herein.

FIG. 3A illustrates a process showing how text is selected from a pre-existing work such as the Bible and the selected and or paraphrased or redacted portion of that text is printed on an article of clothing along with imagery associated with the text in an embodiment taught herein. Additionally, FIG. 3B illustrates a process showing how an accessory is created associated with a selected religious text in an embodiment taught herein.

FIG. 6A illustrates a slingshot and 5 smooth stones manufactured as a bracelet from the story of David vs. Goliath manufactured for children's play and learning of biblical accounts for use with FIG. 5C in an embodiment taught herein. FIG. 6B illustrates a whale from the story of Jonah and the whale manufactured for children's play and learning of biblical accounts for use with FIG. 5A in an embodiment taught herein. FIG. 6C illustrates a boat from the story of Noah's Ark manufactured for children's play and learning for use with FIG. 5B in an embodiment taught herein.

FIG. 10A illustrates a blanket utilized in telling the story of a biblical character and storing various items therein in an embodiment taught herein. FIG. 10B illustrates a closeup of a pocket utilized in the blanket of FIG. 10A in an embodiment taught herein. FIG. 10C illustrates various devices utilized in association with the pockets of FIG. 10A, 10B in an embodiment taught herein.

DETAILED DESCRIPTION OF THE INVENTION

Figure 1A:
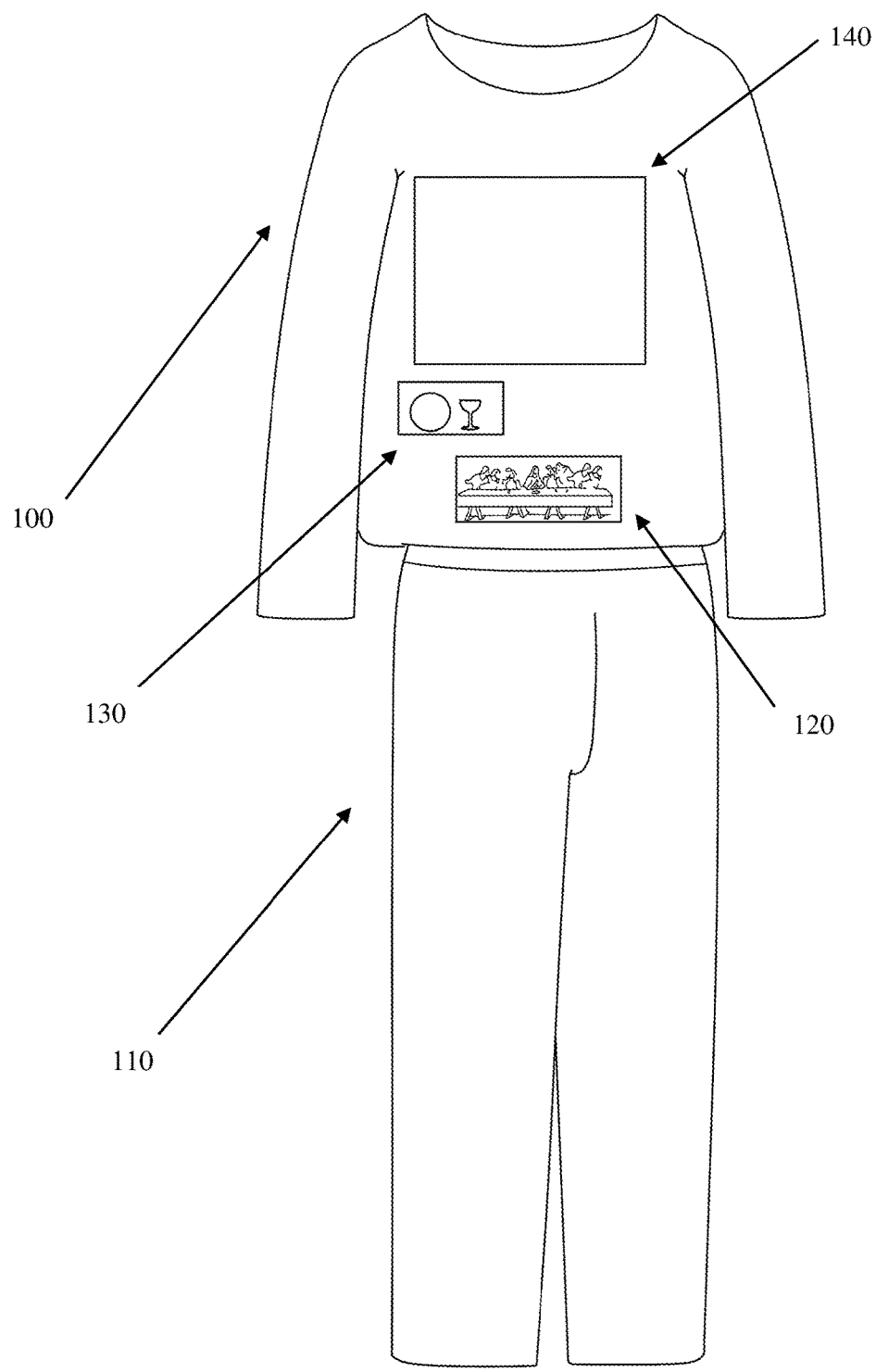
FIG. 1A, 1B illustrates an embodiment of an article of clothing that demonstrates how imagery and printed the word upon an item creates a religiously oriented educational tool. In particular.

FIG. 1A illustrates an embodiment of an article of clothing 100 that demonstrates how imagery and printed word upon an item creates a religiously oriented educational tool. The clothing can be made from any natural (wool, linen) or manmade (polyester, spandex) cloth, leather or other type of material suitable for this purpose. In particular, FIG. 1A illustrates a unisex articles of clothing 100 and 110 having religious imagery and a printed passage from the Bible.

A top pajama shirt 100 has some text 140 printed on it; in this particular exemplary embodiment, a passage from the New Testament Matthew 26:26-30 is shown dealing with Jesus Christ being the Bread and Blood of the New Testament. A bottom portion 110 shows a typical bottom part of a pajama 110 that can likewise have a printed religious theme (although not shown in the FIG.). Additionally, two items are also printed on the shirt for religious instruction including a communion set 130 and a drawing of the Last Supper 120.

Figure 1B:
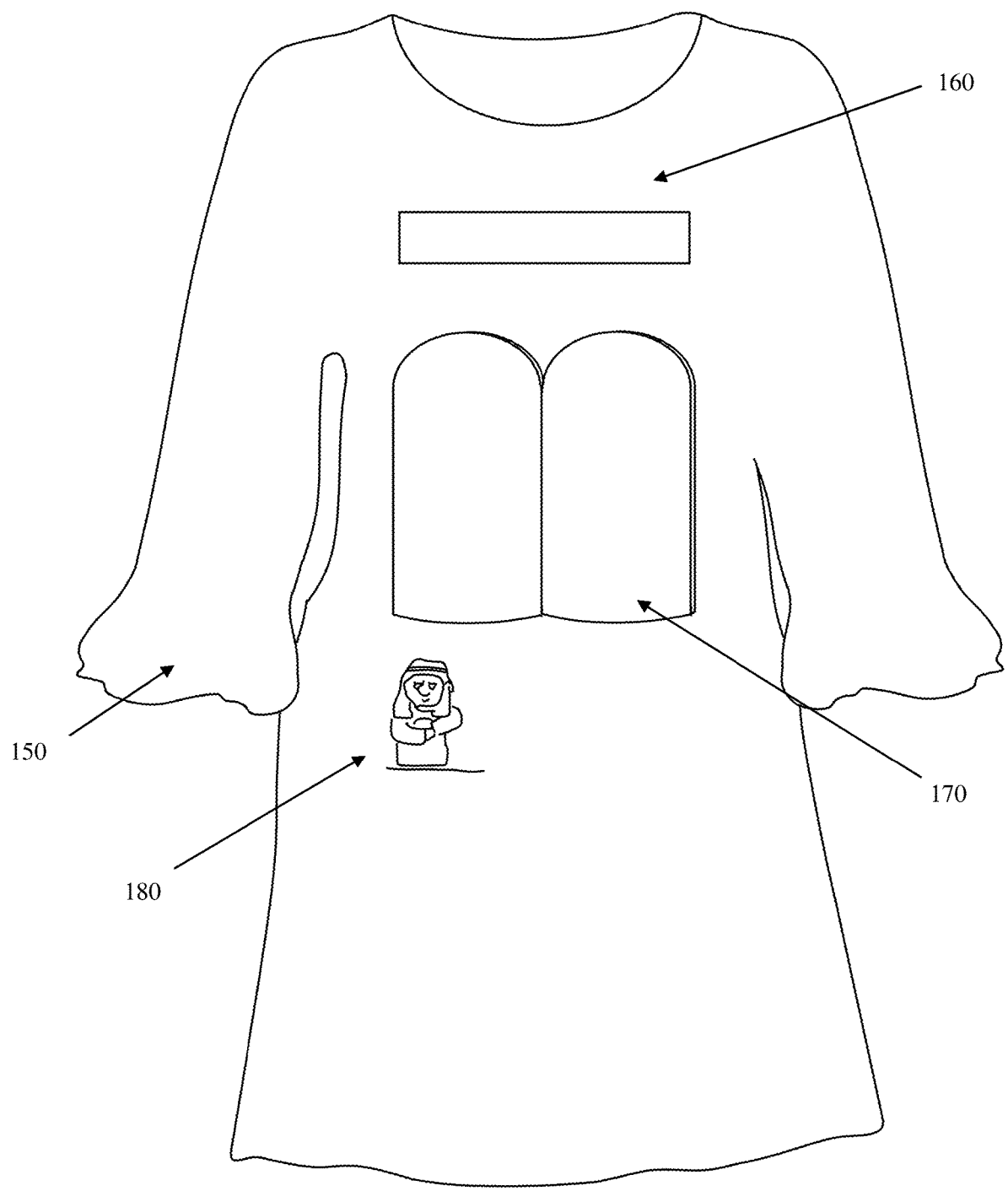

FIG. 1B illustrates how a typically feminine article of clothing educates young girls about religion. A nightgown or smock type of clothing 150 is shown in FIG. 1B that gives another example of the teachings herein. A relevant passage 160 is selected and printed on the article of clothing. Also, a set of two illustrations, in this instance the Two Tablets of the Ten Commandments 170 are printed along with internal text indicative of the passage mentioned previously. Another drawing 180 has also been printed thereon so as to grasp the attention of the user and help him or her understand the import and meaning of the printed text.

FIG. 2A, 2B, 2C illustrates embodiments of accessories created in combination with the religiously oriented clothing of FIG. 1A, 1B. FIG. 2A illustrates a communion chalice 210, whilst FIG. 2C shows paten 220 and host 230 utilized as accessories to teach people about their religious beliefs in embodiments taught herein. These can be made from any suitable type of plastic, metal, ceramics, glasses, clays or other manufactured or naturally occurring material. FIG. 2B illustrates two tablets 240, 250 of the Ten Commandments teaching youngsters about their religious beliefs. These can be made from any suitable type of plastic, metal or other manufactured or naturally occurring material.

Figure 3A:
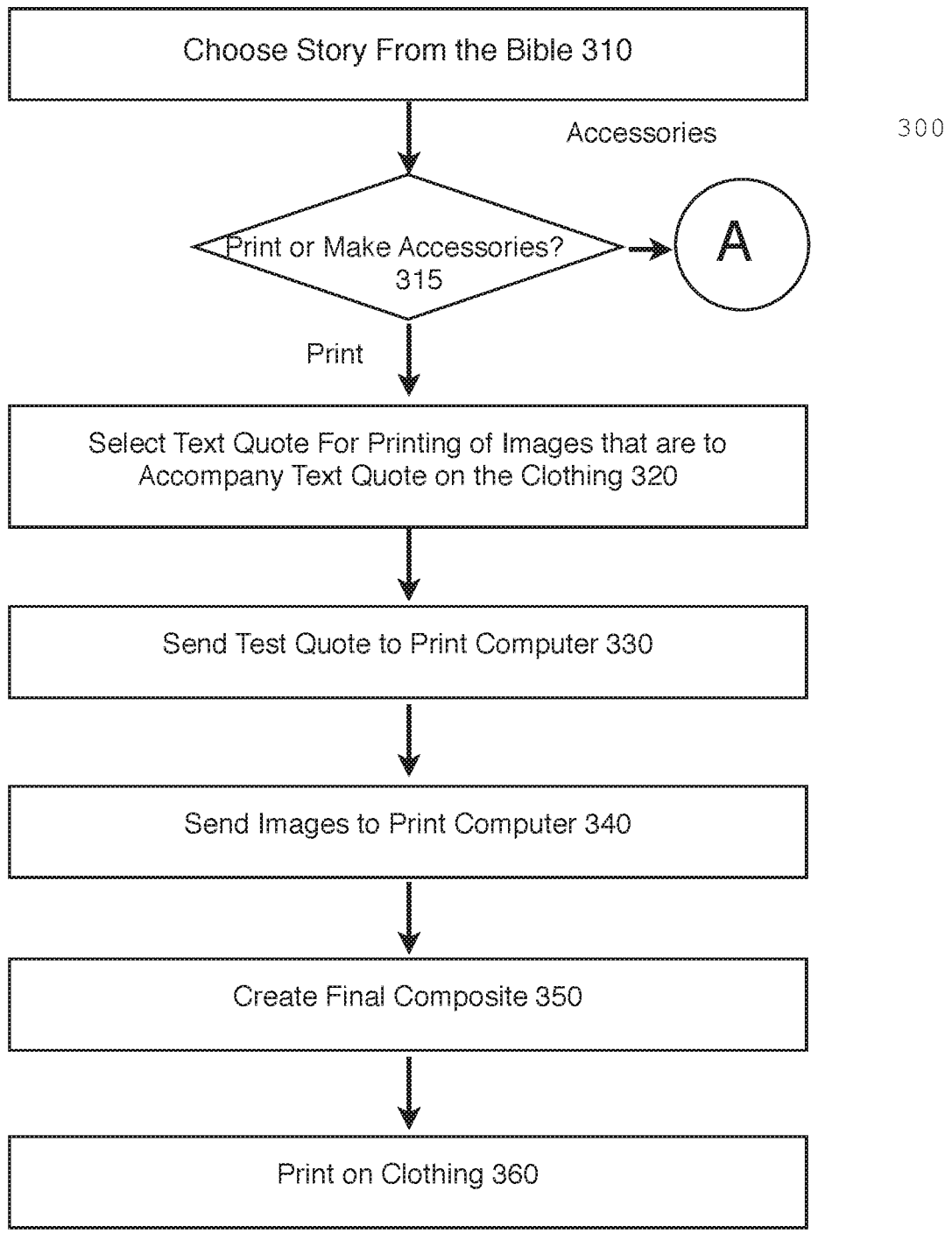
FIG. 3A-3B illustrates an embodiment of a process by which a story is selected for printing along with imagery and the creation of accessories.
Figure 3B:
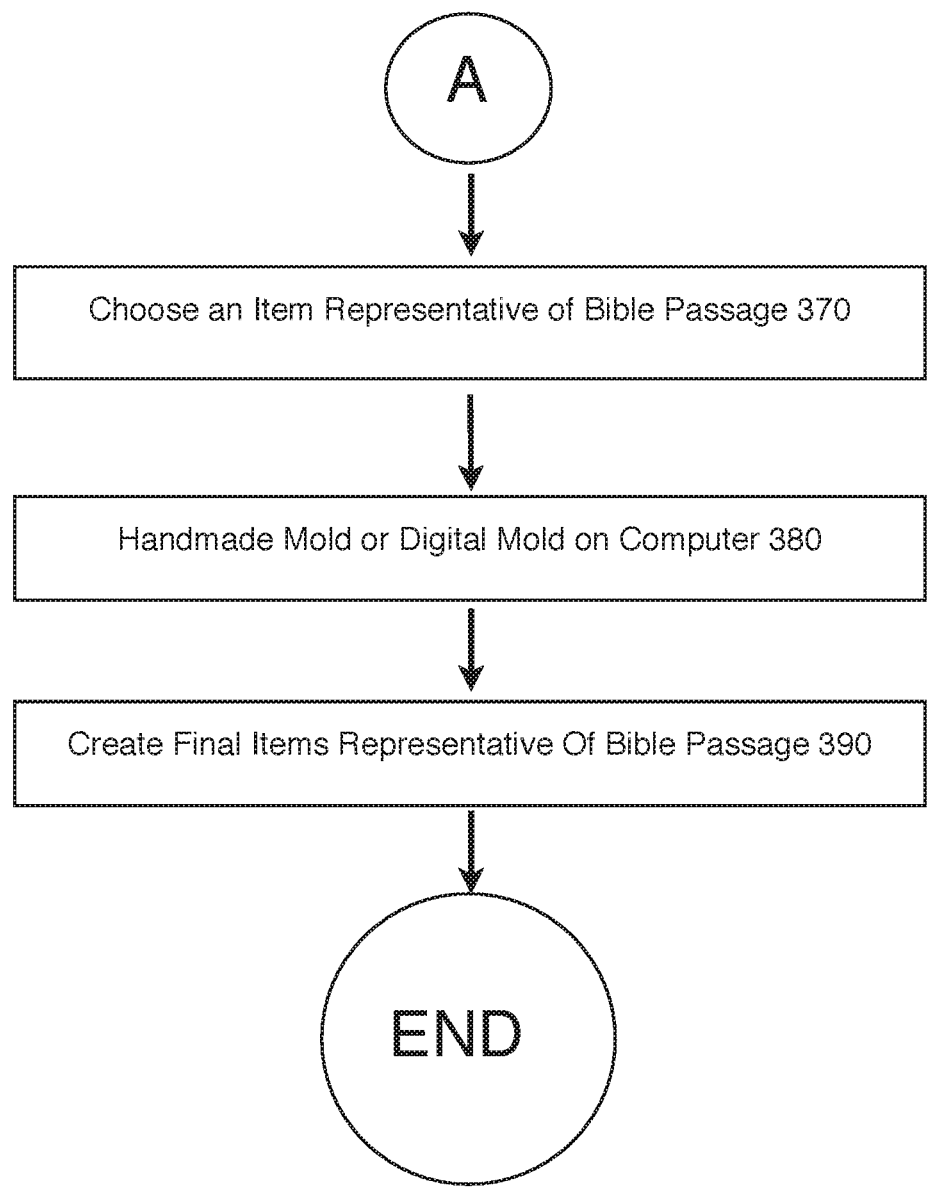

FIG. 3A, 3B illustrates embodiments 300 of a process by which a story is selected for printing along with imagery and the creation of accessories. FIG. 3B illustrates a process showing how text is selected from a pre-existing work such as the Bible and the selected and or paraphrased or redacted portion of that text is printed on an article of clothing along with imagery associated with the text. The process 300 begins with a user choosing 310 a story from a useful educational text such as the Bible. Then a user determines 315 whether to make an accessory or print the selected exact copy, redacted, paraphrased or any combination of the aforementioned text unto an article of clothing for educational purposes. If a user wants to make an accessory then he proceeds to 'A' and FIG. 3B.

If not then the user continues to the next step in the process of choosing 320 the selected exact copy, making a redacted, paraphrased or any combination of the aforementioned text. He or she would then send 330 the text to a printer via computer or load it manually into a printing device. If images are to used, he or she would then create the images and send 340 them to a printer via computer or load it manually into a printing device. Next, a final composite of the text and images for printing are created 350 and the text and images are printed 360 on the clothing.

Additionally, FIG. 3B illustrates a process showing how an accessory is created associated with a selected religious text in an embodiment taught herein. A user first chooses 370 an item from a passage that is indicative of it. These can be anything that represents a particular passage such as David's sling and five stones, Aaron's staff, Ark of the Covenant, Burial Shroud, Nativity Cradle and more. Then a handmade mold or digital mold is constructed 380; the digital mold would be made on CAD type computer system. Finally, the items representing a particular passage are manufactured 390 through the use of injection molding, hand molding or similar processes.

Figure 4:
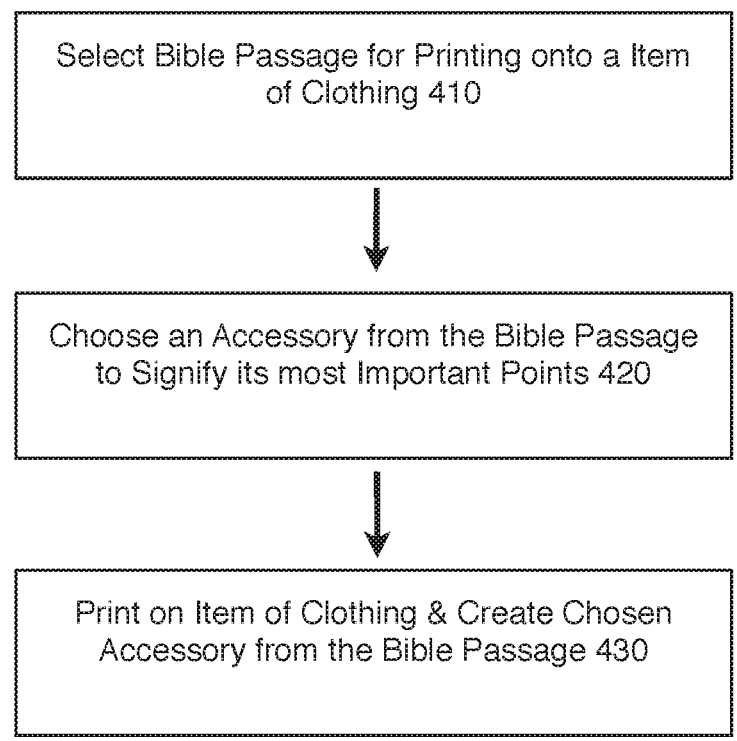
FIG. 4 illustrates an embodiment of the overall process greatly simplified on how to create an article of clothing and accessory for an educational purpose.

FIG. 4 illustrates an embodiment 400 of the overall process greatly simplified on how to create an article of clothing and accessory for an educational purpose. First an educational passage is selected 410 from a literary work such as the Bible along with imagery to be printed on the clothing for educational purposes. Then an accessory is chosen 420 from the literary work indicating its most important themes. Finally, printing of the text and images along with creation of the accessory is accomplished 430.

Figure 5A:
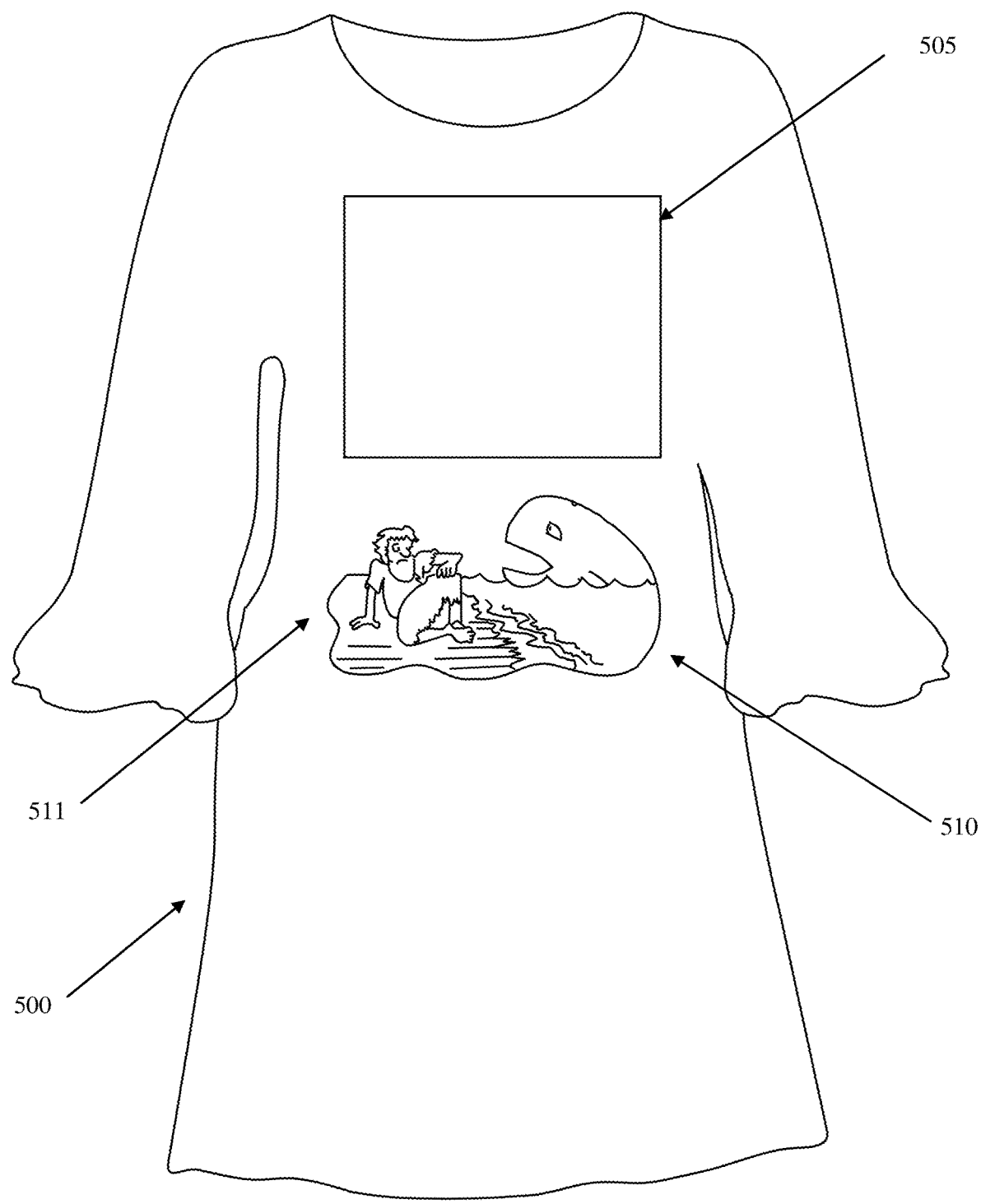
FIG. 5A illustrates an embodiment of an article of clothing that demonstrates how imagery (Jonah and the whale) and printed word upon an item creates a religiously oriented educational tool.
Figure 5B:
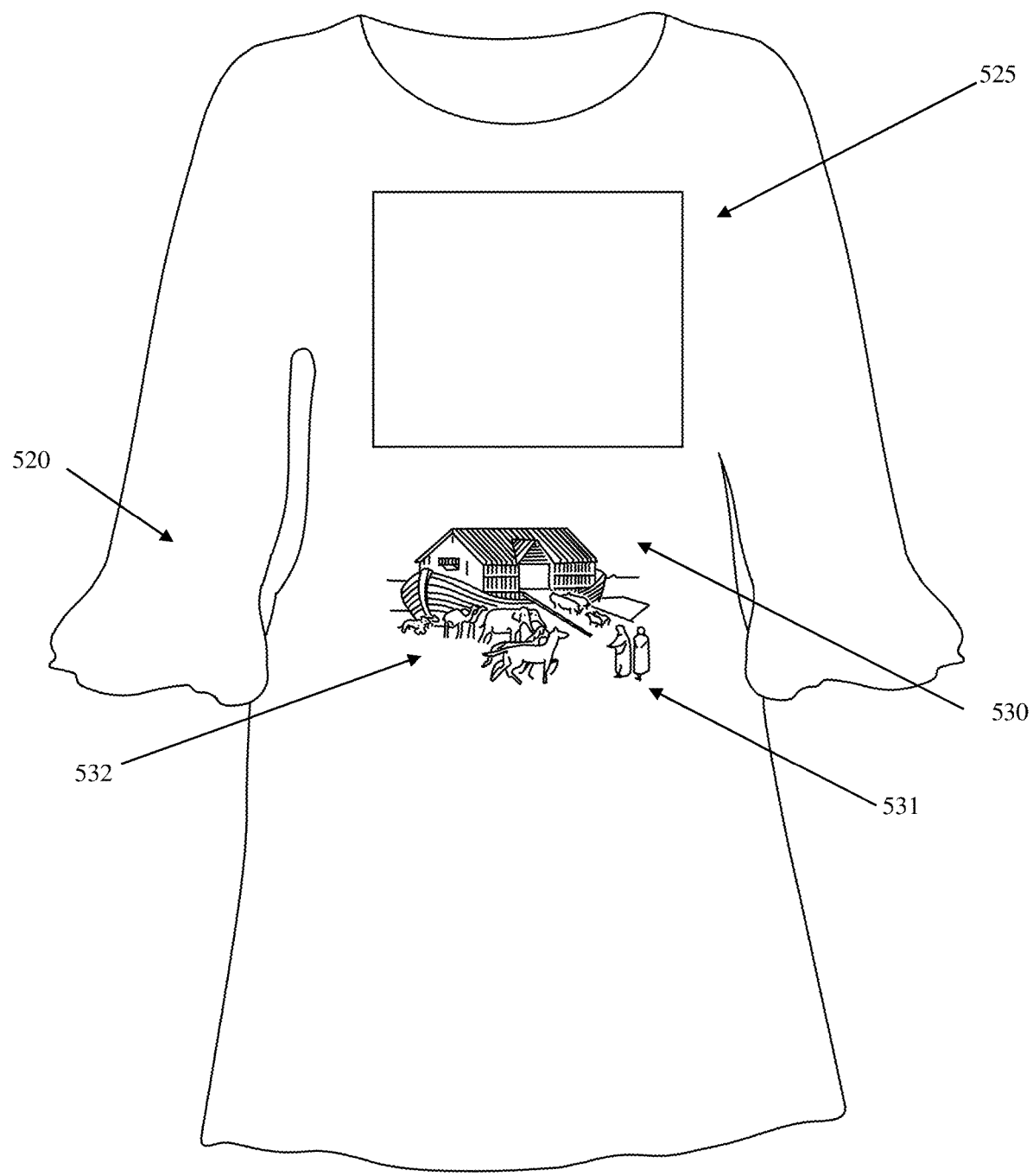
FIG. 5B illustrates an embodiment of an article of clothing that demonstrates how imagery (Ark and Animals) and printed word upon an item creates a religiously oriented educational tool.
Figure 5C:
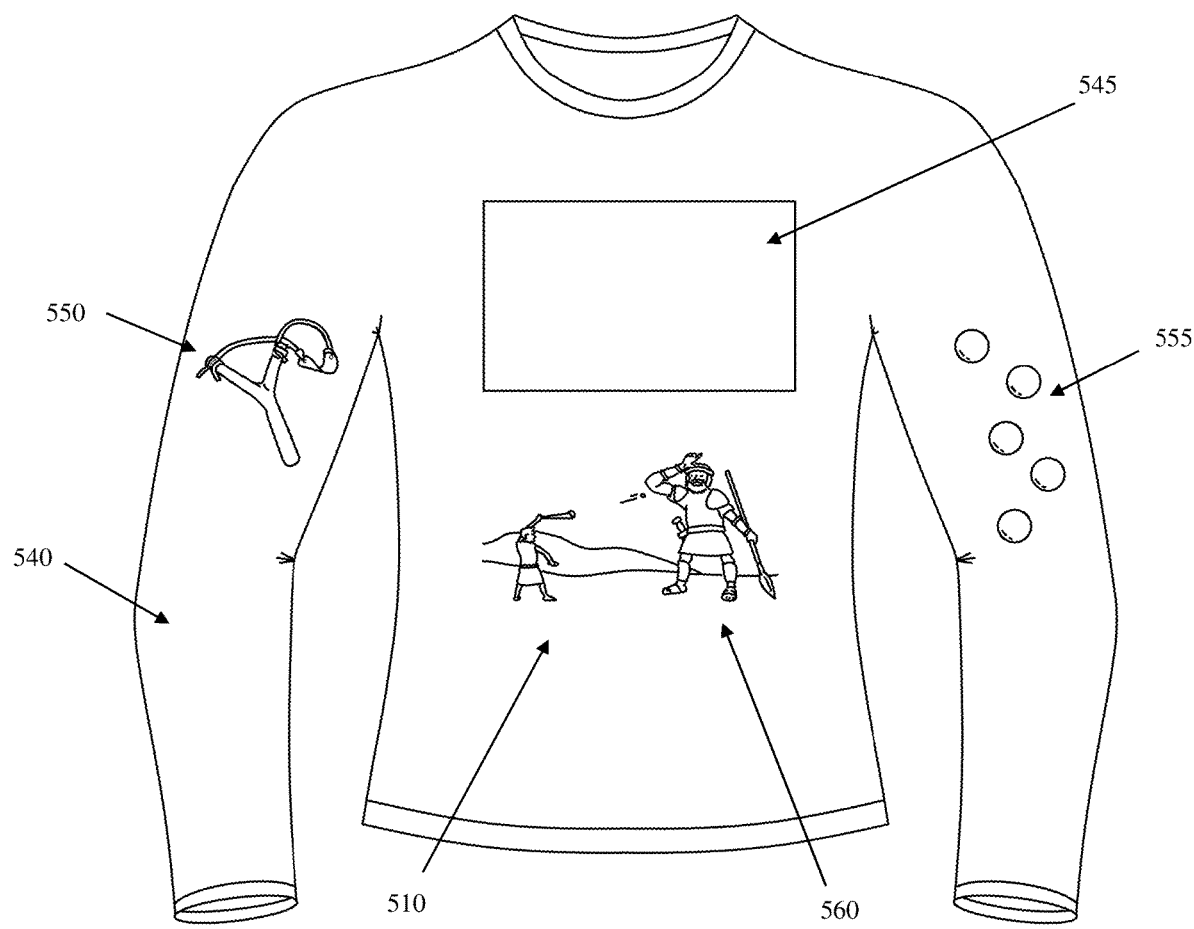
FIG. 5C illustrates an embodiment of an article of clothing that demonstrates how imagery (David, Goliath, Sling, Stones Bracelets) and printed word upon an item creates a religiously oriented educational tool.

FIG. 5A, 5B, 5C illustrates an embodiment of an article of clothing 500 that demonstrates how imagery and printed word upon an item creates a religiously oriented educational tool. The clothing can be made from any natural (wool, linen) or manmade (polyester, spandex) cloth, leather or other type of material suitable for this purpose. In particular, FIG. 5A illustrates a feminine article of clothing 500 having religious imagery and a printed passage from the Bible. A top region 505 has some text printed on it; in this particular exemplary embodiment, a passage from the Old Testament Jonah 2 is shown dealing with the whale that swallowed the reluctant prophet Jonah who would not help the people of Nineveh until convinced by God. Additionally, two items 510, 511 are also printed on the shirt for religious instruction including a a whale 510 and Jonah 511.

FIG. 5B illustrates an embodiment of how a typically feminine article of clothing educates young girls about religion. A nightgown or smock type of clothing 520 is shown in FIG. 5B that gives another example of the teachings herein. A relevant passage 525 is selected and printed on the article of clothing. Also, a set of three illustrations, in this instance Noah's Ark 530, a giraffe 531, and an elephant 532 are printed along with internal text indicative of the passage mentioned previously. It is desired that the text and imagery will help grasp the attention of the user and help him or her understand the import and meaning of the printed text.

FIG. 5C illustrates an embodiment of how a unisex article of clothing educates youngsters about religion. A top shirt 540 is shown in FIG. 5C that gives another example of the teachings herein. A relevant passage 545 is selected and printed on the article of clothing. Also, a set of four illustrations, in this instance a sling 550 on a shoulder, a bracelet of five smooth stones 555, Goliath 560, and David 570 are printed along with internal text indicative of the passage mentioned previously. It is desired that the text and imagery will help grasp the attention of the user and help him or her understand the import and meaning of the printed text.

Figure 6A:
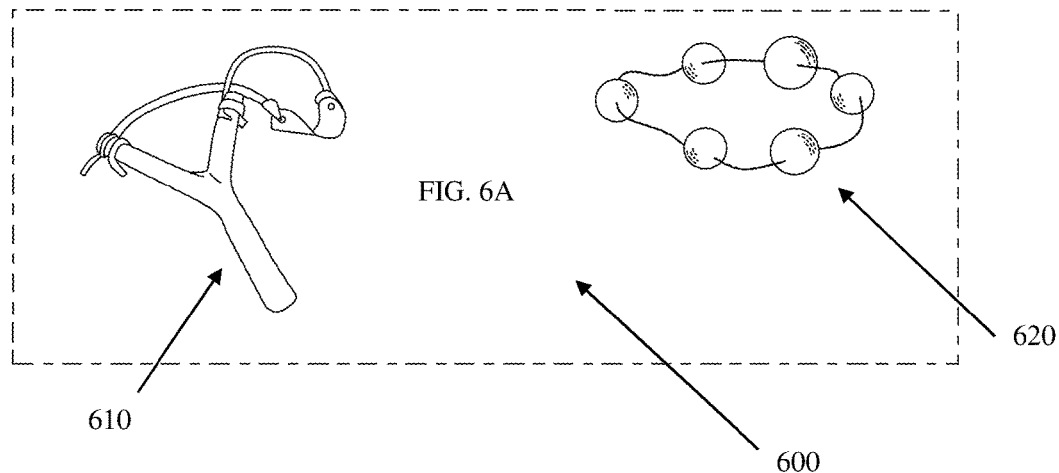
FIG. 6A, 6B, 6C illustrates an embodiment of accessories created in combination with the religiously oriented clothing of FIGS. 5A, 5B, 5C.
Figure 6B:
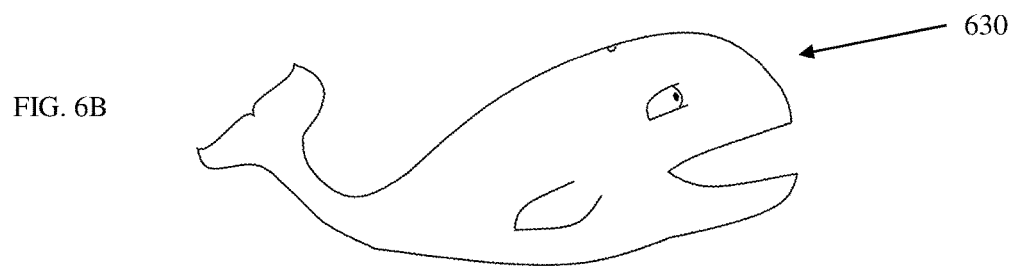
Figure 6C:
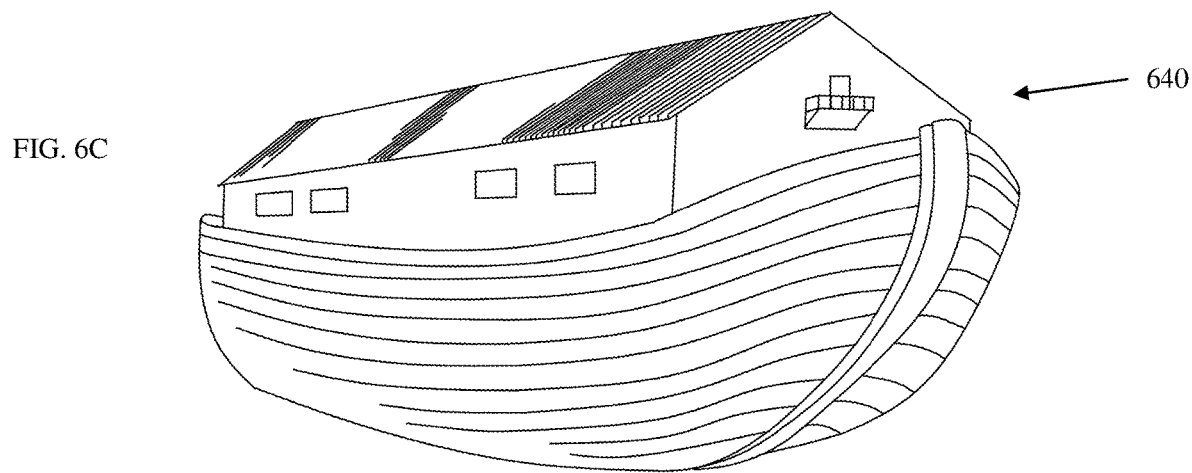

FIG. 6A, 6B, 6C illustrates an embodiment 600 of accessories created in combination with the religiously oriented clothing of FIG. 5A, 5B, 5C. FIG. 6A illustrates a sling 610 and bracelet of five smooth stones 620 utilized as accessories to teach people about David and Goliath in an embodiment taught herein. These can be made from any suitable type of plastic, metal, ceramics, glasses, clays or other manufactured or naturally occurring material. FIG. 6B illustrates a whale 630 utilized as accessories to teach people about their religious beliefs in particular the story of Jonah. This can be made from any suitable type of plastic, metal, ceramics, glasses, clays or other manufactured or naturally occurring material in an embodiment taught herein. FIG. 6C illustrates Noah's ark teaching youngsters about their religious beliefs. This can be made from any suitable type of plastic, metal or other manufactured or naturally occurring material in an embodiment taught herein.

Figure 7A:
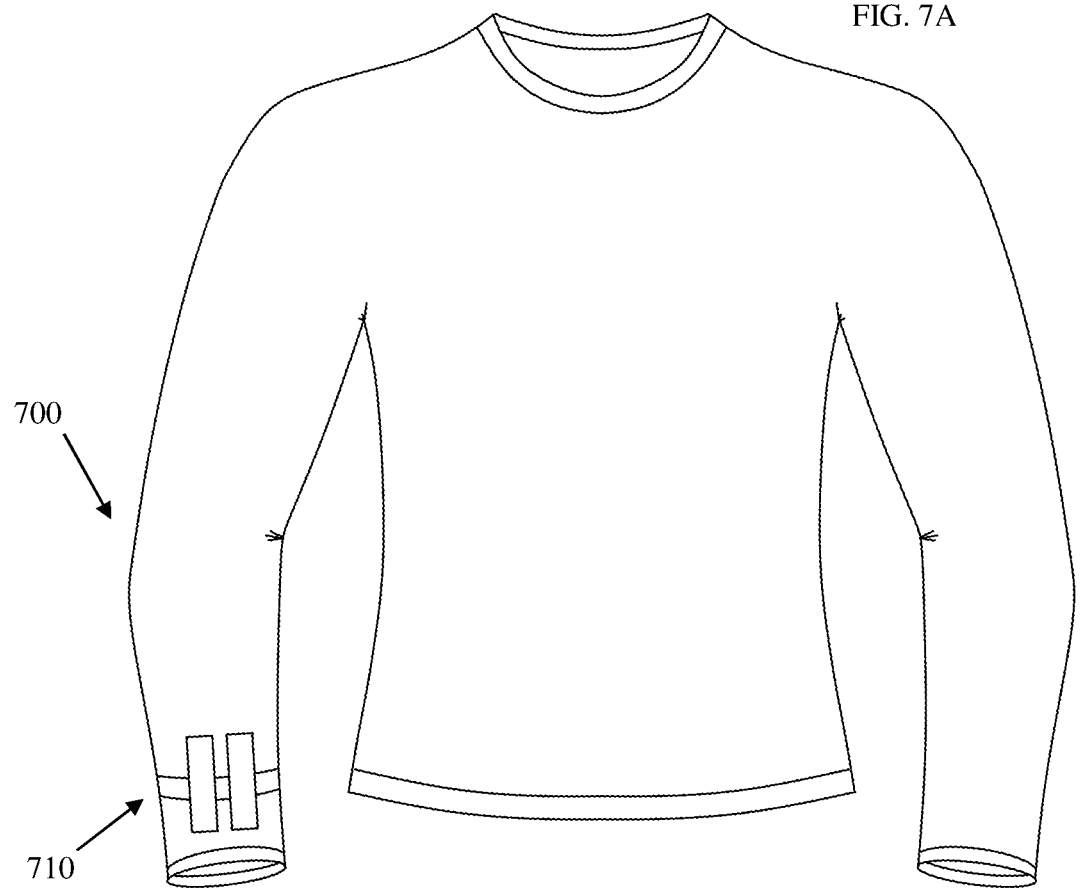
FIG. 7A illustrates a lighting device such as a glow in the dark device or a glow ring that has been adapted to be attached to the sleeve of a pajama in an embodiment taught herein.
Figure 7B:
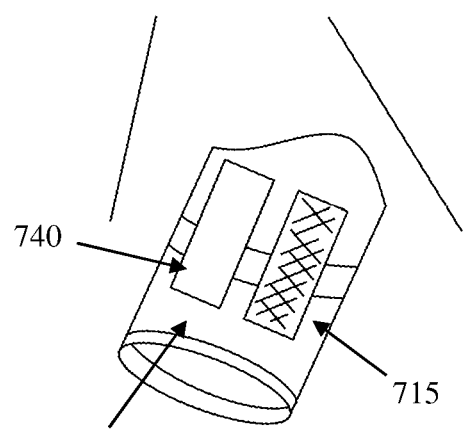
FIG. 7B shows how these are detached from the sleeve in an embodiment taught herein.
Figure 7B:
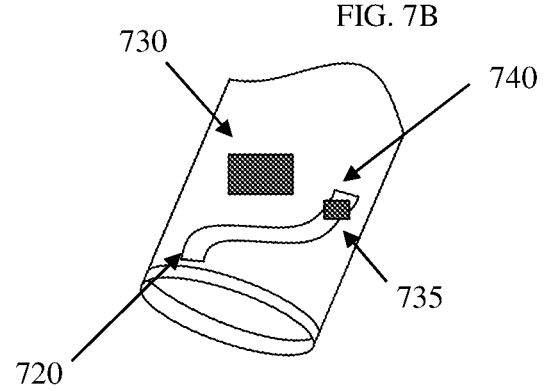

FIG. 7A illustrates a device such as a glow in the dark device or a glow ring 715 that has been adapted to be attached to the sleeve of a pajama. The glow in the dark device 715 can be made from plastics that include the suitable materials having the glow in the dark property for long duration usage or a glow ring that has a short duration utility. A pajama, smock or nightgown sleeve 700 has a lighting device 715 attachment system 710 shown in the FIG. 7A. FIG. 7B shows how these are detached from the sleeve in an embodiment taught herein. Two hook and loop fastener straps 740 are shown attached at one end 720 by sewing to the exterior end of a sleeve portion. A hook patch 730 is attached to the sleeve and a corresponding set of loops 735 is attached to the underside end of strap 740. The end where the loops 735 are attached is opposite the sewn end 720 of the strap 740. Thus when the loops 735 are brought into proximity with the hooks 730 they effect a connection between them.

Figure 8:
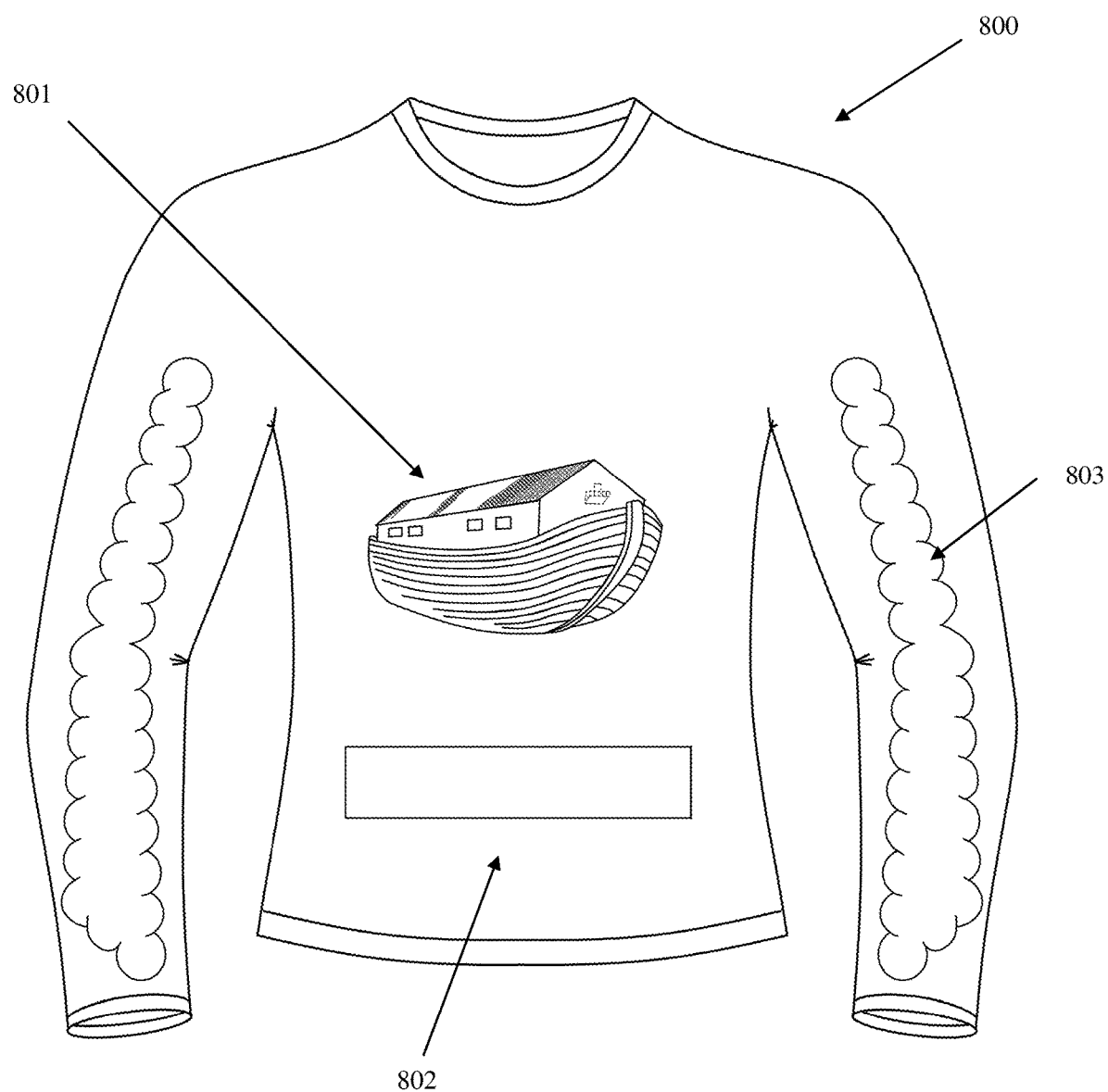
FIG. 8 illustrates an alternative embodiment of the inventive system.

FIG. 8 illustrates an alternative embodiment of the inventive system. Here one or both sleeves has a portion, paraphrase or complete text 803 of the relevant passage of the bible. The front portion of the shirt of the pajama has a drawing 801 and a citation of the passage including chapter and verse (s) are printed thereunder.

The embodiments taught herein have shown examples of Biblical passages but they should not be limited to those mentioned herein; rather, any story from the Bible can be utilized in order to practice the embodiments taught herein. Further, whilst pajama type clothing has been described herein, it can be appreciated that the embodiments are applicable to many types of clothing from shorts and t shirts to jeans and long sleeve sweaters, the embodiments are easily adaptable to any type of clothing line. Also, it can be appreciated that steps in the process can be moved and rearranged in other combinations without departing from the spirit and scope of the invention. For example, the process of creating the accessory can occur before the particular text is selected or manipulated through redaction or paraphrasing of the text, afterwards or simultaneously; any of the sequence of steps that can logically changed are variations on the theme taught here.

Figure 9:
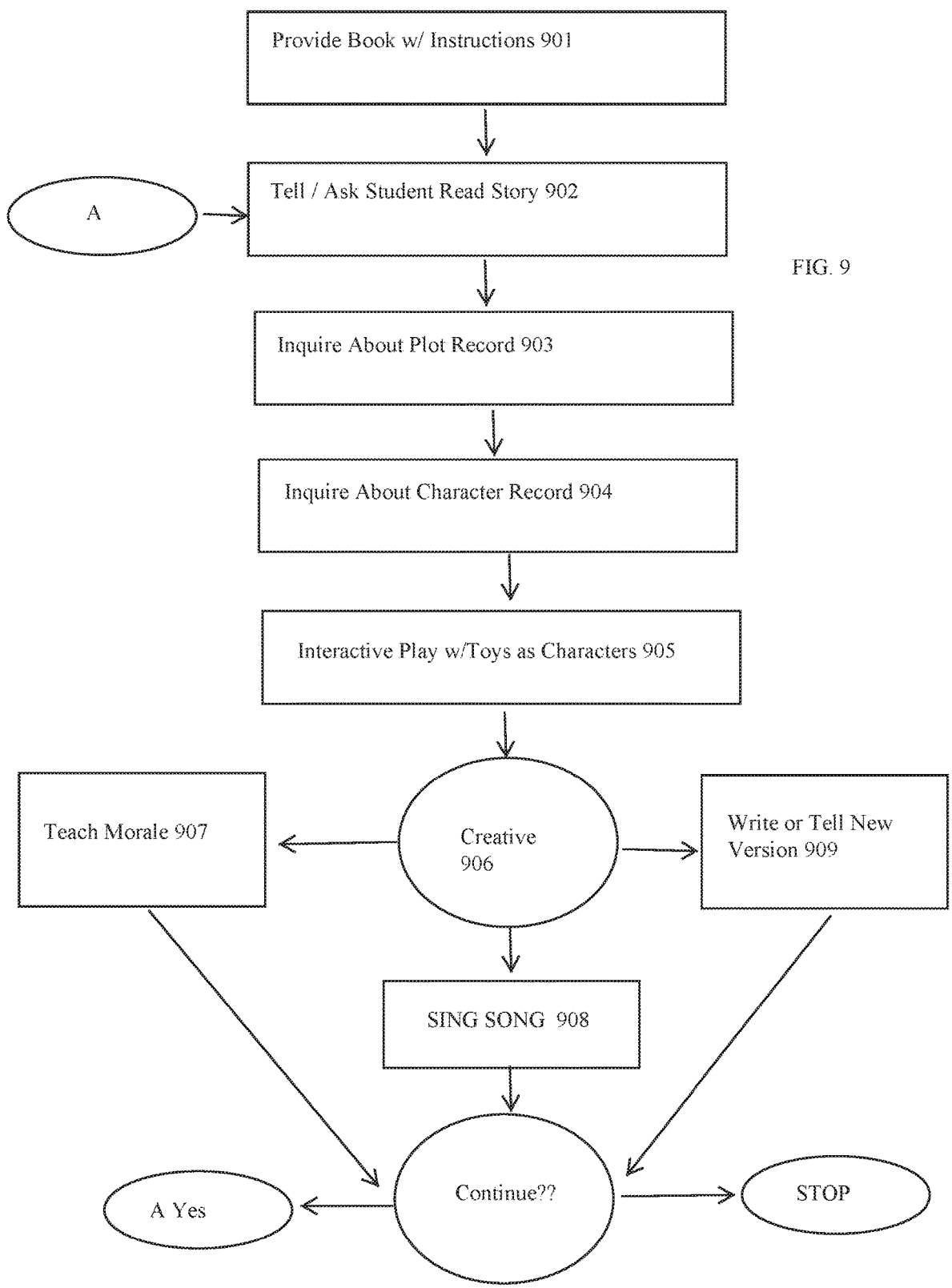
FIG. 9 illustrates a flowchart of a process utilizing a book, toys and interactive play and recording of the daily activities thereof to assist children in learning a religiously themed subject matter.

FIG. 9 illustrates a flowchart of a process utilizing a book (or mobile app loaded on cell phone), toys and interactive play and recording of the daily activities thereof to assist children in learning a religiously themed subject matter. First, a book is provided 901 along with associated toys stored in a box along with the book(s), pajamas, or optionally in a blanket with pockets. The process continues with a teacher asking 902 a student to read a story to the group or to the teacher if it is one on one. The teacher continues asking 903 a series of questions about the plot and the children's individual responses are recorded in the teacher's book and the students' books that has a lined place for this. Included in the question list are principle characters 904, action sequences, associated accessories including toys, plot resolution and morale of the story. The children's responses are all recorded and tabulated in the book so that each pupil can interact with each other and help one another. This information is later used when they break up into groups so that they can free style talk about the varying impressions on the story and why they were different.

The teacher/instructor suggests interactive play 905 of willing volunteers or requests different students to play a part along with the toys stored in the optional blanket or in a storage box provided. At this point the students are guided in a creative decision process 906 having three options asking them whether they would like to know about the story morale, sing a song or rewrite the story with the same or new meaning; the students decide what to do or the teacher decides which they will do. The first option is that the teacher educates 907 the class about the morale of the biblical story indicating the various shades and themes of each character as developed through the passages and asks them why this is so?

What happened to make it so? How did it happen? and similar questions to direct and guide them to a full understanding thereof. A second creative option is to sing 908 a prepared song included with each passage in the book. The final creative option is that each student is to write or create a new version of the story 909 which is recorded in his or her book and read to the group. From each of these options, a teacher/instructor can decide to stop the process or continue it by proceeding to step 902 again.

The above process is also possible using a mobile app downloaded off the internet, hotspot or wifi. The teacher has an interactive device which transmits the educational steps taught above to each of the students who have a similar app loaded on their own local device. Responses are collected therefrom and sent back to the teacher for review. Interactive buttons and or menus are provided on the app for the transmission of information to and from the teacher and the students and vice versa. The app has an interactive interface showing various features taught by the story including moral, characters, plot, locations, important phrases and similar items thereby permitting students to select and bring up important information at the end of the exercise for study purposes.

FIG. 10A illustrates a blanket utilized in telling the story of a biblical character and storing various items therein. The blanket 1006 shows an image of a story such as the story of Jonah "The Great Whale" where parts of the story can be printed on the blanket for inspiring interest therein along with keywords associated with the story such as Faith, Fortitude, Obedience, Repentance, Mercy etcetera. A group of pockets 1001 is formed along a top portion of the blanket 1006. A book 1002, a toy 1003, a pillowcase 1004, a pajama 1005 are shown for loading into the pockets of the blanket.

FIG. 10B illustrates a closeup of a pocket utilized in the blanket of FIG. 10A. The pocket 1001 is made from a piece of material 1001F attached to a surface of the blanket where the right side 1001E, left side 1001D and bottom side 1001C of the piece of material 1001F are sewn to the top surface of the blanket 1006. The top portion 1001G of the piece of material 1001F is free, forming a mouth for the pocket and the top surface of the blanket. On the inside surface lip 1001B of the piece of material 1001F is a hook and loop fastener material affixed thereto with glue, adhesive, or heat treatment. There is a corresponding piece of material 1001A that is attached to the top surface of the blanket 1006 thereby providing a locking mechanism for the pocket 1001.

Figure 11A:
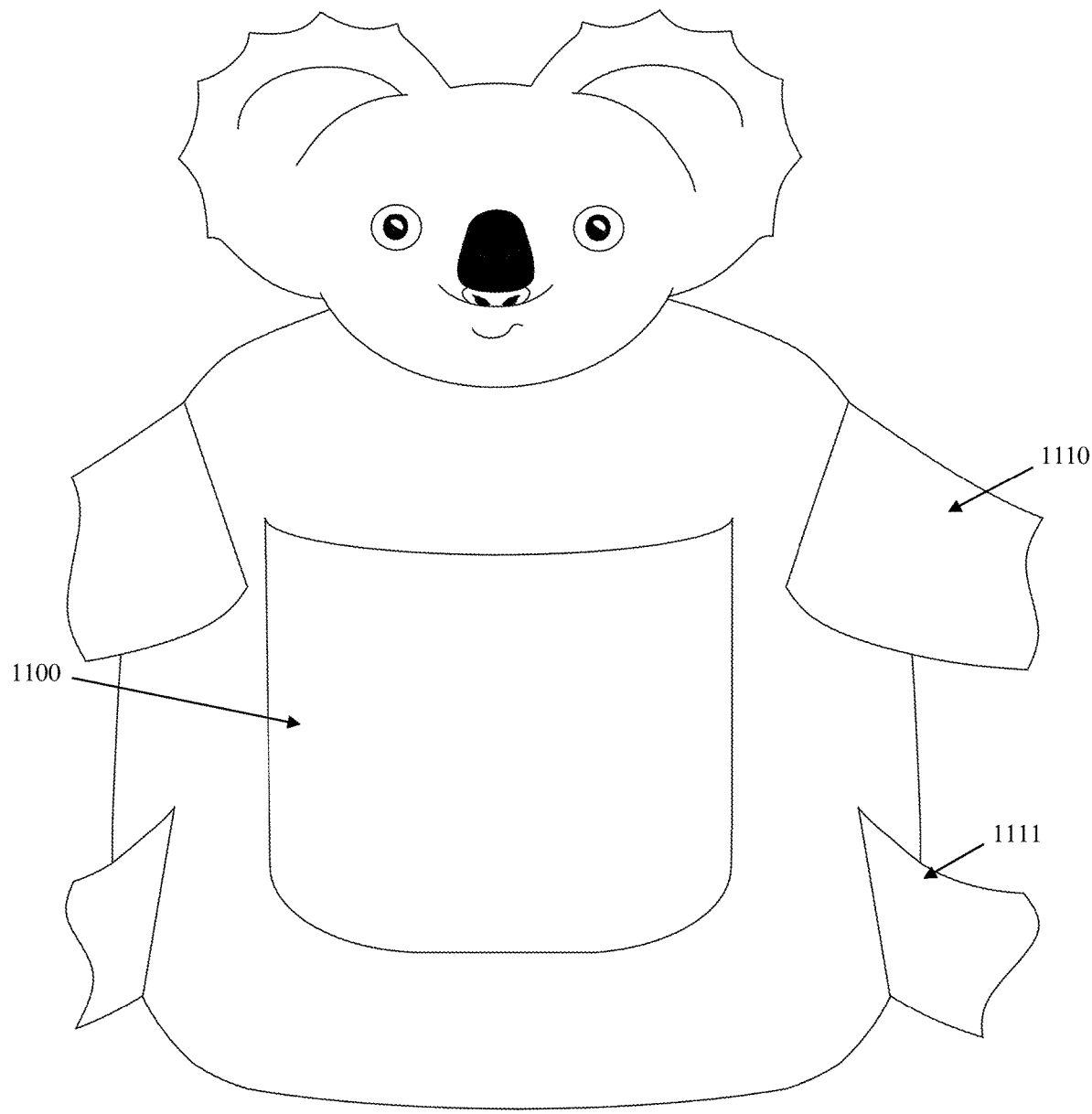
FIG. 11A illustrates how a blanket, comforter or similar device has a closeable figurine on its side having a pocket with the close-able arms open in an embodiment taught herein.
Figure 11B:
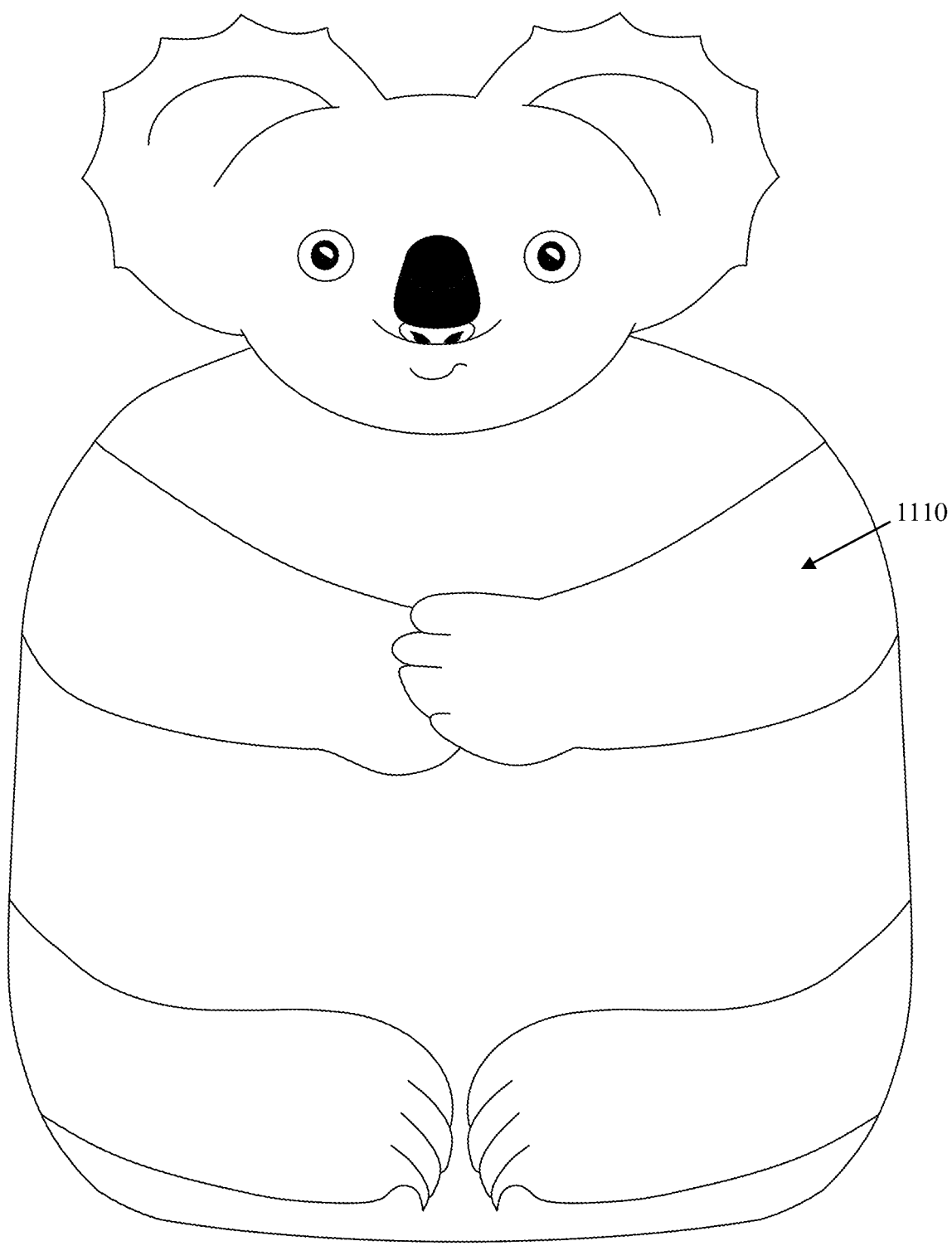
FIG. 11B illustrates how a blanket, comforter or similar device has a close-able figurine on its side having a pocket with the close-able arms closed in an embodiment taught herein.

FIG. 11A illustrates how a blanket, comforter or similar device has a closeable figurine on an edge or side of the blanket having a pocket with the close-able arms open in an embodiment taught herein. A marsupial or similar creature figure is sewn at its back into a side of a blanket or comforter (or attached via hook and loop fasteners on back of figure with corresponding hook and loop fasteners on blanket, comforter, sheet and so forth). The marsupial has several arms, legs or appendages 1110-1111 that are normally open for kids play; each of the arms or legs attaches at its respective end to the body of the character (attached on the blanket, sheet, or comforter) and is sewn therein. In the center of the figure is a pocket or pouch 1100 made from a piece of material having four sides with three sides sewn to the blanket and or marsupial figurine (or similar character) and an open side forming the pocket mouth for storage of items therein. Corresponding hook and loop fasteners on the inner lip of the open side and underneath it on the marsupial surface complete the closure thereof. Also, the marsupial has arms 1110 that can be closed about the pocket using hook and loop fasteners (not shown) on the end of each arm (or legs) corresponding with the opposite horizontal arm (or legs) or attached to the exterior surface of the pocket, comforter, blanket, sheet using hook and loop fasteners. FIG. 11B illustrates how a blanket, comforter or similar device has a close-able figurine on its side having a pocket with the close-able arms closed in an embodiment taught herein. Here the hook and loop fasteners attached to arms 1110 at top permit closure between the top two arms with hook and loop fasteners corresponding pieces near an end (paw) of the left top arm and near the end (paw) of the bottom of the right arm. In the bottom set, the legs 1111 have hook and loop fasteners on the bottom of both legs and has corresponding hook and loop fasteners on the body of the figure, pocket, (blanket, sheet, or comforter when character has an opening in its body thereto or is not fully displayed in its full form so that the bed cover, sheet, blanket, comforter is actually a portion of the figure body) as appropriate for closure. An alternative would be that the bottom legs 1111 close like the top arms 1110 one atop another or the top arms close like the bottom legs where they attach to the figure body, blanket, sheet, comforter.

Figure 12:
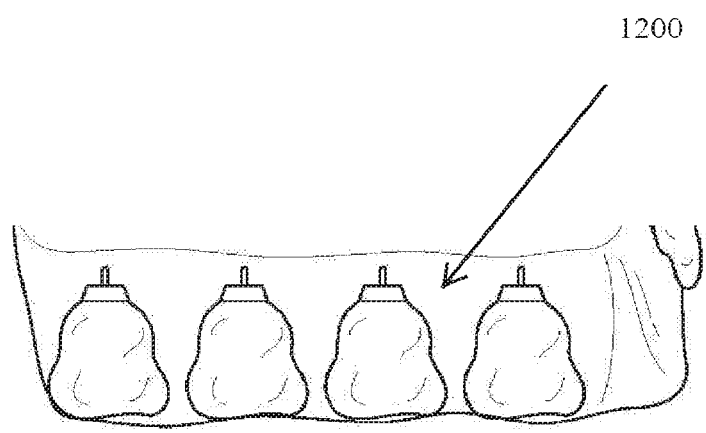
FIG. 12 illustrates a blanket, comforter or similar device having one or more pouches attachable with hook and loop fasteners in an embodiment taught herein.

FIG. 12 illustrates a blanket, comforter or similar device having one or more string close-able pouches attachable with hook and loop fasteners in an embodiment taught herein. The pouches 1200 are attachable with hook and loop fasteners with a portion attached on the back thereof and the other piece attached on the blanket with corresponding hooks and loops making the hook and loop fastener pairing. This facilitates a child removing the pouch and carrying it away from the play area of the blanket comforter or similar device. The pouch is closed by a pull string that closes the mouth of the pouch.

Figure 13:
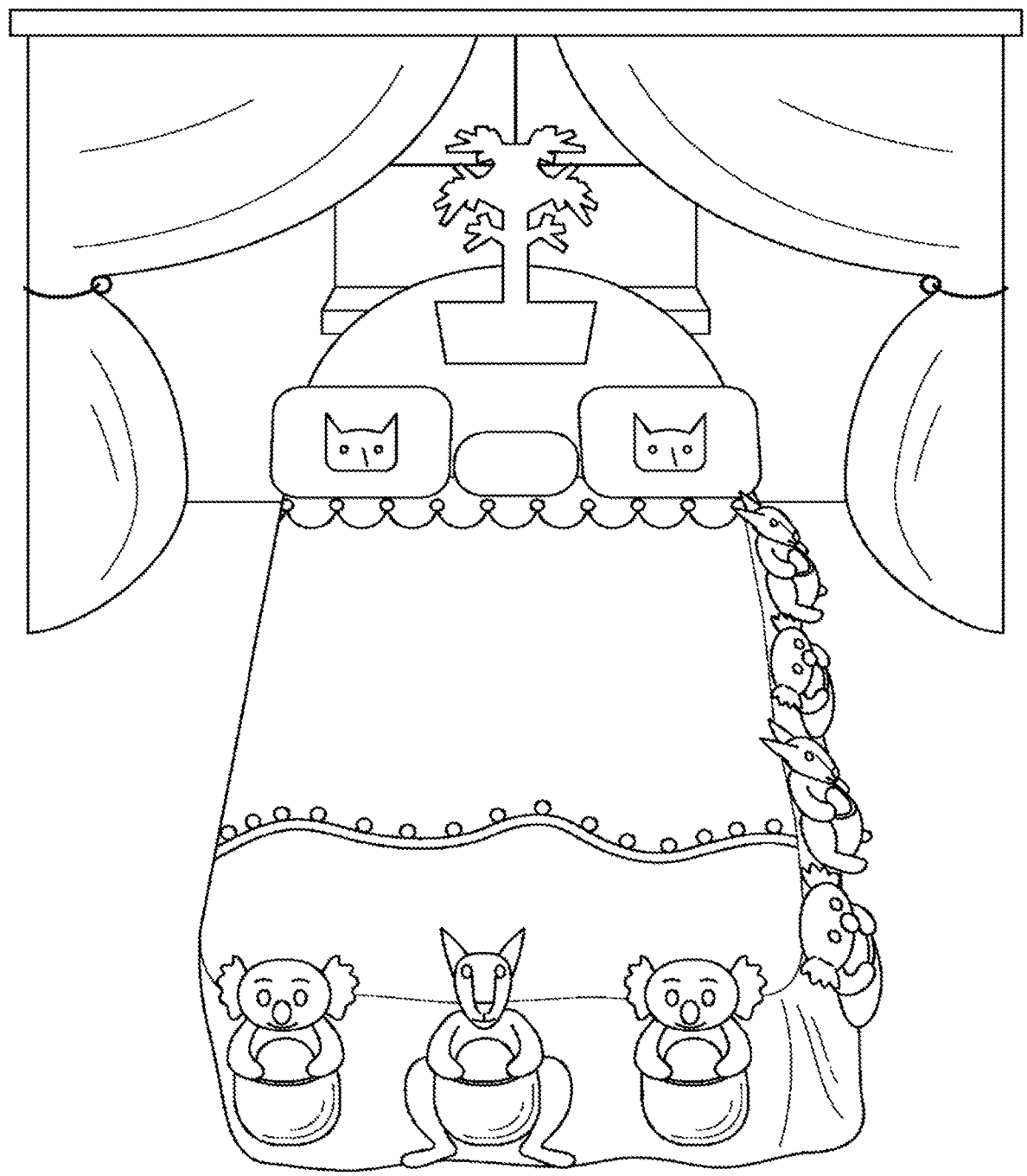
FIG. 13 illustrates a group of marsupials having pouches attached via hook and loop fasteners on their backs to the edge of a blanket on a bed; the hook and loop fasteners on the back of the marsupial and on the blanket cooperate together and also facilitate the child's removing them for playing with various different marsupial characters.

FIG. 13 illustrates a group of marsupials having pouches on their bellies attached via hook and loop fasteners on their backs to the edge of a blanket on a bed; the hook and loop fastener on the back of the marsupial and on the blanket cooperate together and also facilitate the child's removing them for playing with various different marsupial characters. Alternatively, they are permanently sewn to the edge of blanket for selective storage of items about the bed.

Figure 14:
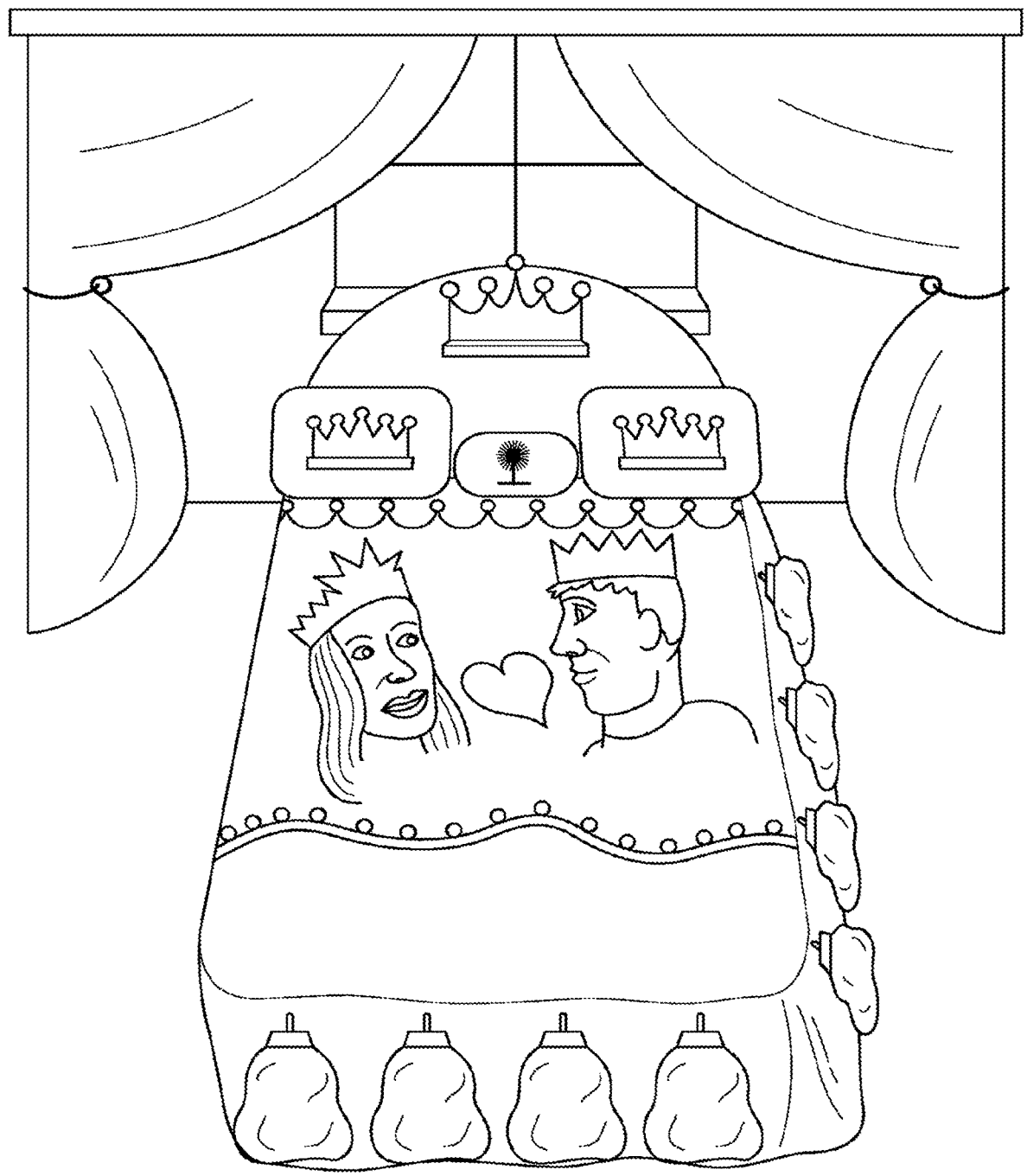
FIG. 14 illustrates a bed having various pouches removably attached via hook and loop fasteners on the back of the pouch and corresponding surface of the blanket or alternatively attached to the blanket.

FIG. 14 illustrates a bed having various pouches removably attached via hook and loop fasteners on the back of the pouch and corresponding perimeter surface of the blanket or alternatively attached to the blanket. The figures on the bed represent a particular main character and theme thereon for teaching of the children.

Figure 15:
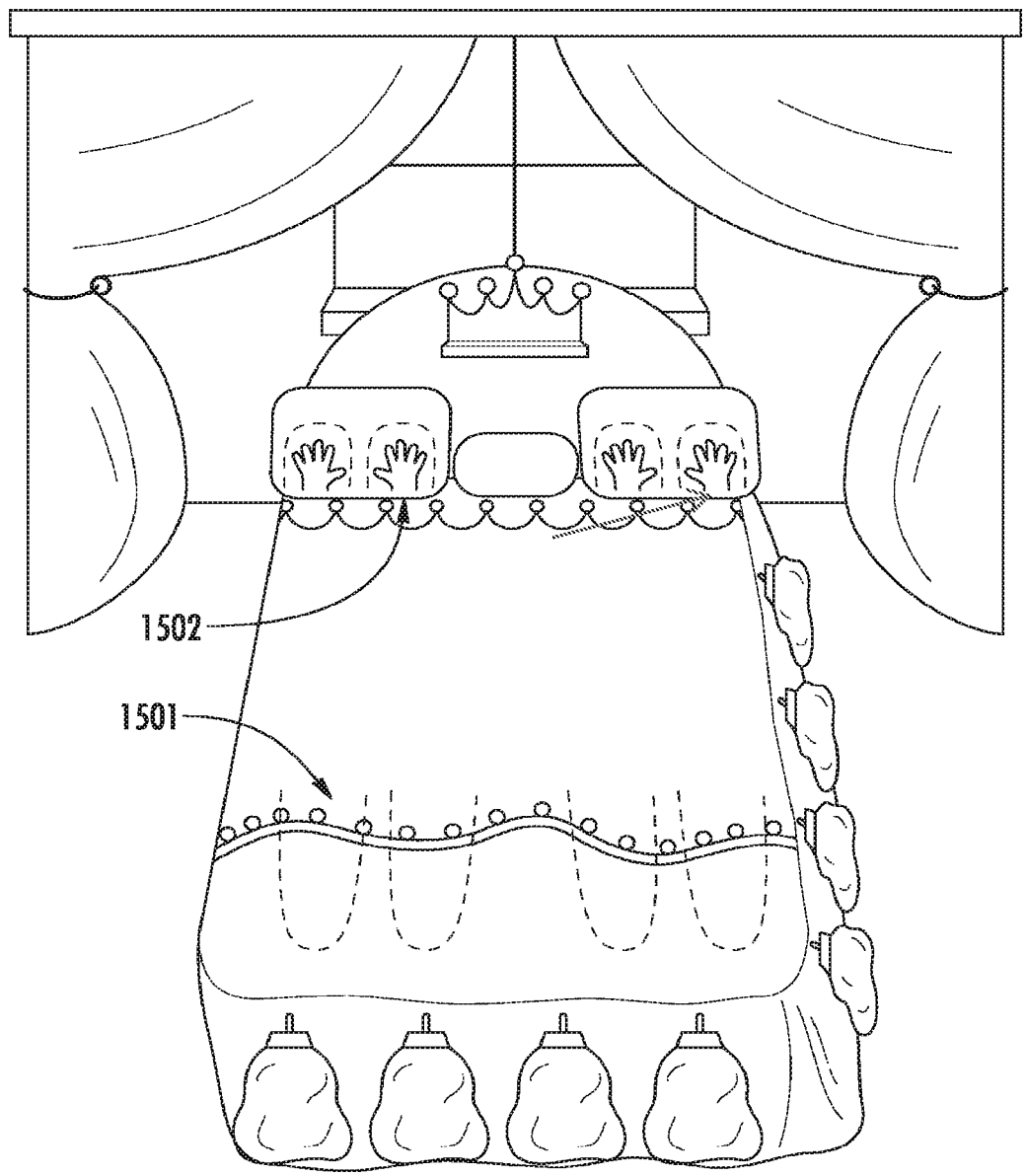
FIG. 15 illustrates a bed having various pouches removably attached via hook and loop fasteners on the back of the pouch and corresponding surface of the blanket or alternatively attached to the blanket.
Figure 16:
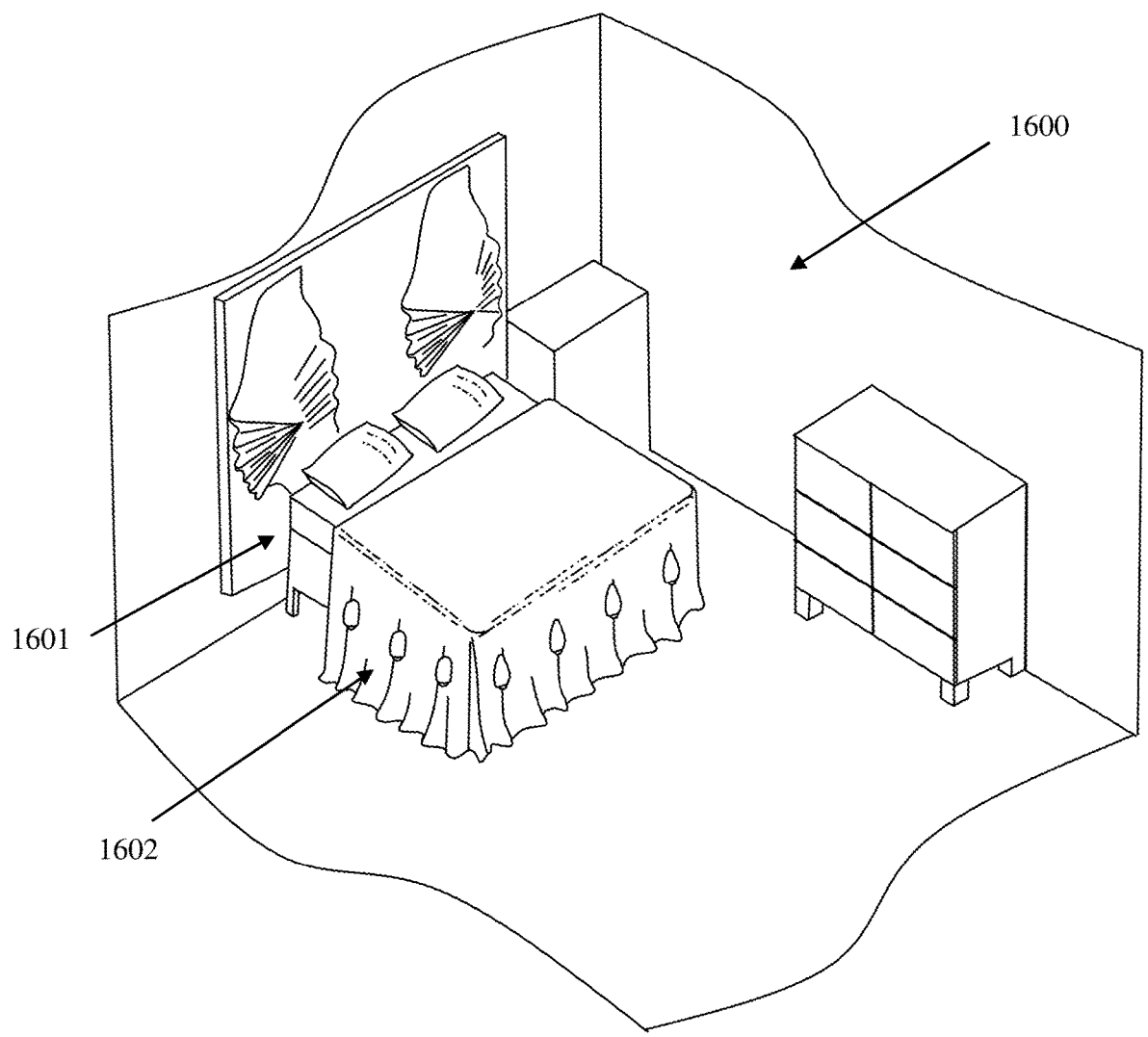
FIG. 16 presents a bedroom set having various novel features incorporated into the materials thereof in an embodiment herein disclosed.

FIG. 15 illustrates a bed having various pouches removably attached via hook and loop fasteners on the back of the pouch and corresponding surface of the blanket or alternatively attached to the blanket. The bed also has a group of foot warmers 1501 attached to the underside of the bed in the shape of an oversized sock for children to insert their feet for comfort. The sock has a typical sock shape (alternatively a simple piece of material sewn to the underside of the blanket on several sides leaving only an open side for sliding in feet) and entry for the foot to slide therein; however, the end of the oversized foot (where the toes are or near there) is sewn to the underside of the blanket. Thus, a child can warm his or her feet by sliding a foot within the oversized warmer 1501. Alternatively, the oversized foot warmer 1501 is attached using a hook and loop fastener piece attached (sewn) to the foot with a corresponding hook and loop fastener piece attached (sewn) to the underside of the blanket for selective attachment, removal and re-attachment of the oversized sock foot warmer 1501 to the aforementioned underside. Similarly, the pillowcases 1502 (pillows) has gloves for insertion of a child's hand therein where a portion of the gloves are sewn into the pillowcases; thus the end of the fingers farthest from the palm of the hand are so attached to the pillowcase (or pillow) or alternatively the palm and lower portion of the fingers of the glove, or some portion thereof or some combination thereof. Alternatively, a combo hook and loop fastener piece attached (sewn) into the glove having a corresponding hook and loop fastener piece attached (sewn) into the pillow or pillowcase permits the selective removal of the hand gloves. Another alternative has a piece of square or rectangular material sewn on three sides to the pillow case inner surface leaving a fourth side free for insertion of the hands between this side and the pillow case material for warming therein.

As another alternative, each of the figures optionally has an external cavity near the location where the hook and loop fastener connection to the blanket; this so that the material of the figure is sewn into a tubular cavity for insertion of a plastic cylinder therein. Sitting within this cavity is a plastic cylinder having an integral wide base; in this optional system, the wide base has hook and loop fastener material adhesively attached thereto to attach to corresponding material on the blanket sewn thereon.

Figure 17:
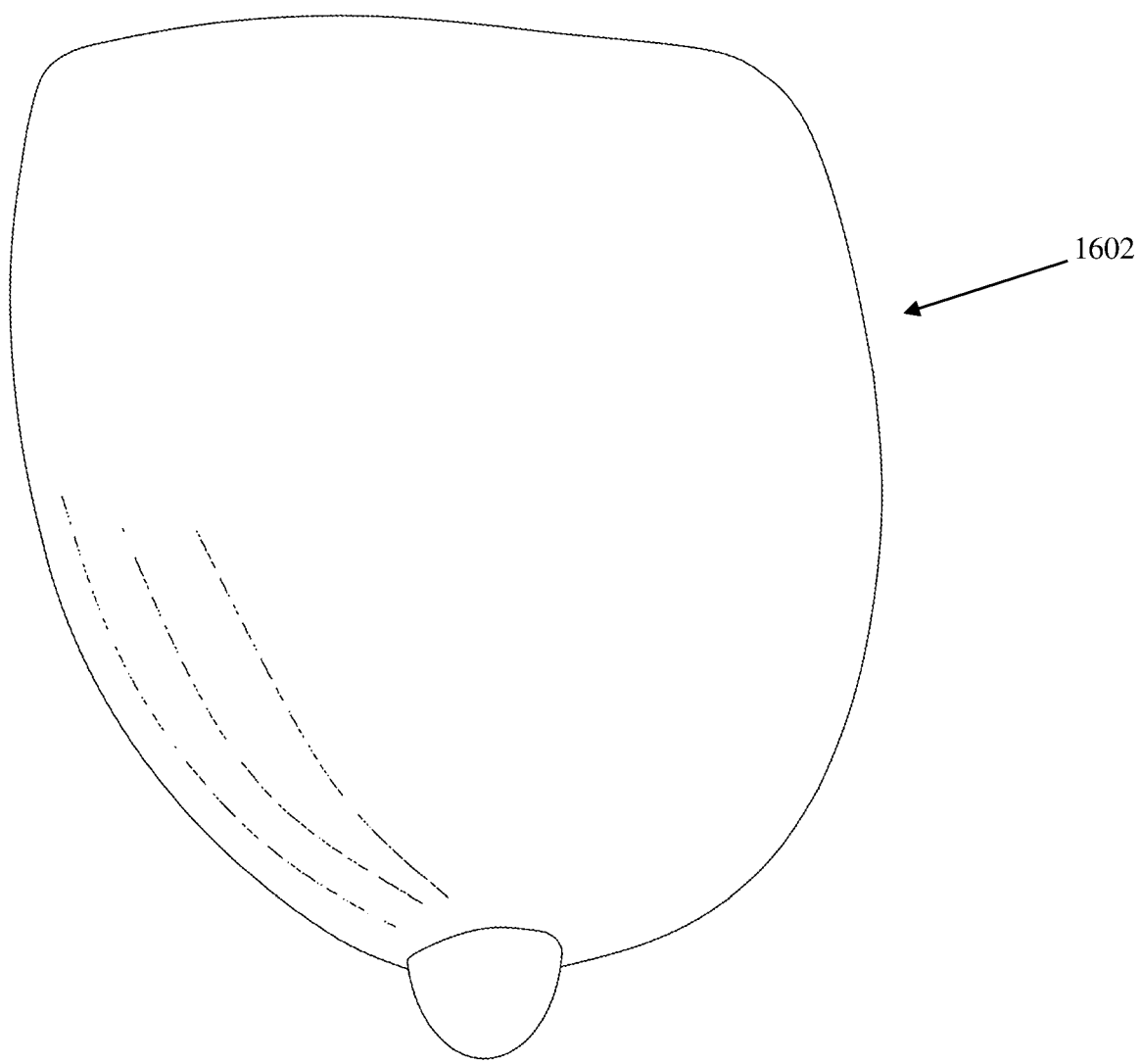
FIG. 17 present a closeup of the partial moon shaped cloth or plastic containers having open mouth and luminous LED lights protruding out the bottom thereof in an embodiment disclosed herein.

FIG. 17 present a closeup of the partial moon shaped cloth or plastic containers 1602 having open mouth and luminous LED lights protruding out the bottom thereof in an embodiment disclosed herein. The partial moon shape is either made from plastic or cloth. If it is made from plastic it is attached via hook and loop fasteners adhesively applied to appropriate edges thereof for cooperative engagement with sewn hook and loop fasteners on appropriate surface of the blanket, comforter or sheet. If made from cloth then the cloth is cutout as one piece and either sewn to an appropriate portion of the perimeter of the blanket, comforter or sheet; alternatively, it is attached via hook and loop fasteners adhesively applied (or sewn) to appropriate edges thereof for cooperative engagement with sewn hook and loop fasteners on appropriate surface of the blanket, comforter or sheet. A plurality of these moon shaped containers form a row of one or more sides of the blanket, comforter or sheet where each row can be as little as one container 1602.

Within the confines of the partial moon shape is a totally enclosed housing having a battery compartment and wiring attached to appropriate contacts thereof which wiring exits the housing through a small hole therein and attaches to an LED bulb through another hole at the bottom of the container 1602 through which the LED bulb protrudes. As an additional option, the LED bulb is optionally inserted within an appropriately shaped support member made from clear or colored plastic with flanges on its sides; these are large enough such that it is held within another hole thereby facilitating the protection of the bulb from the environment and children's activities. Also, there are optional materials that cover the housing so as to separate it from the upper portion of the container having space for toys, clothes and so forth; these cover materials when made from cloth are sewn above the housing internal to the container 1602; or are plastic materials molded integral and internally within the plastic container 1602 or snapped in place using appropriate locking tabs/slots there between. Thus, these cover materials form the bottom of the space for insertion of toys, clothing and so forth.

Figure 18:
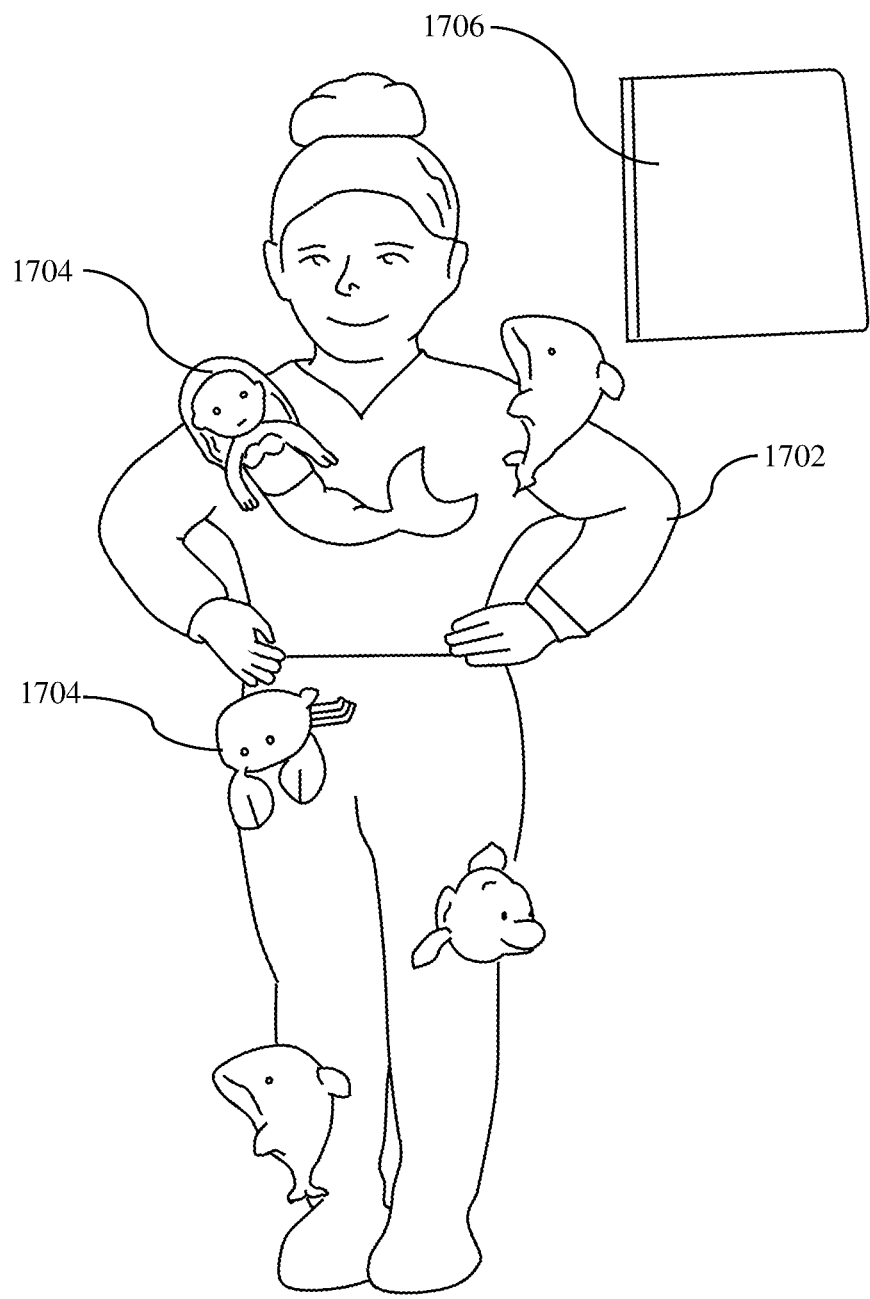
FIG. 18 shows an example pajama set having three-dimensional features during daytime in accordance with some implementations.

FIG. 18 shows an example pajama set 1800 having three-dimensional features shown during daytime (or in an illuminated environment) in accordance with some implementations. In some implementations, pajamas 1702 (and/or blankets) can include three-dimensional stuffed animals or shapes 1704 emanating from the pajamas at the torso, arms and/or legs of the pajamas, as well as from the blanket, which can include matching storage pockets formed into the three-dimensional stuffed animals or shapes 1704.

The three dimensional animals or shapes (e.g., sea creatures 1704) can include a hidden pocket and be removable for a child to store things in (and the animals to cuddle with) during bedtime. The pajamas and blanket system can also include a book 1706 having a theme that matches the blanket and/or pajamas, thus a child can have bedding with removable three-dimensional stuffed toys that can optionally illuminate, pajamas with removable three-dimensional stuffed toys that can optionally illuminate, and a book that corresponds to the theme.

Figure 19:
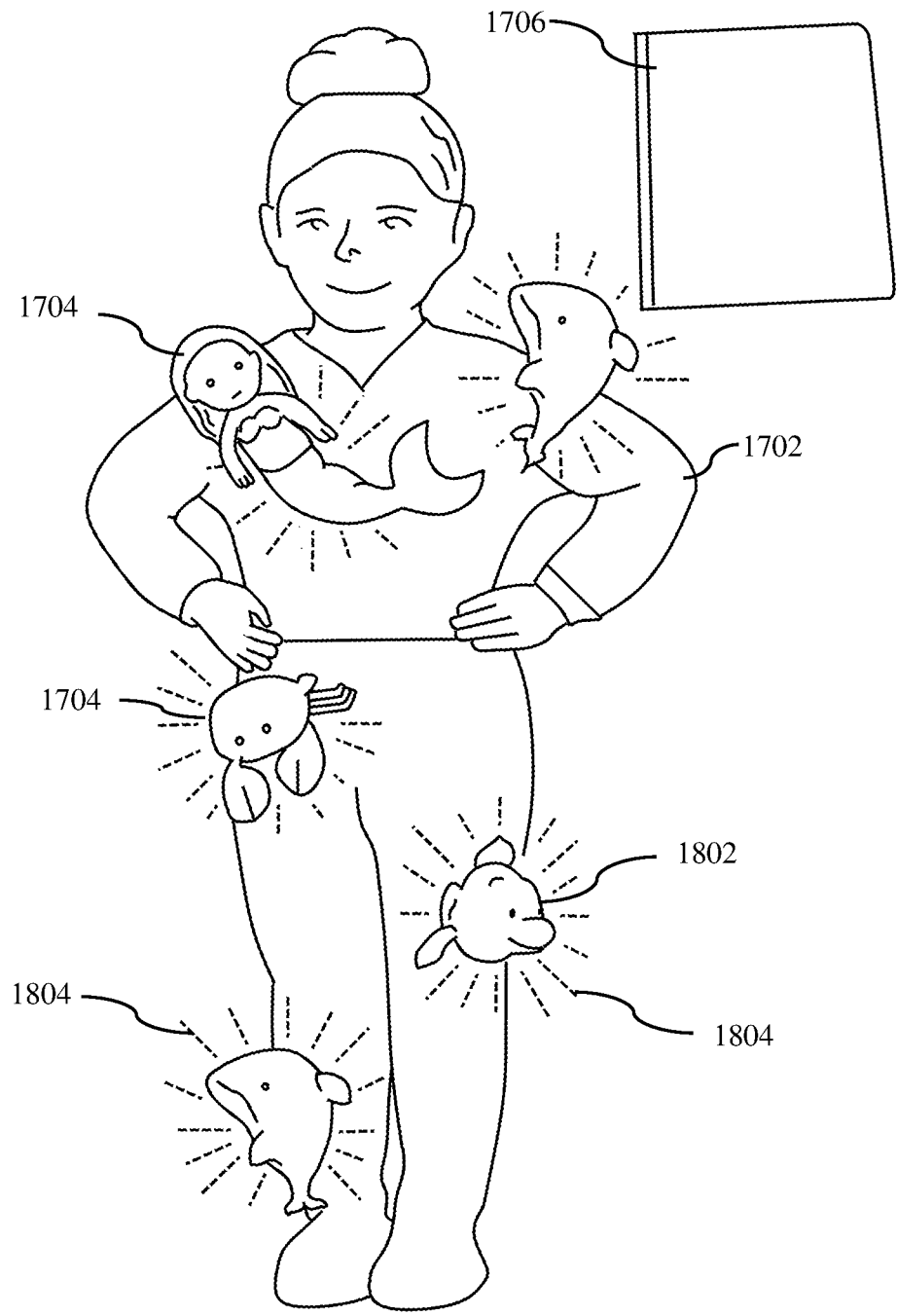
FIG. 19 shows an example pajama set having three-dimensional features during nighttime with illumination features activated in accordance with some implementations.

FIG. 19 shows an example pajama set having three-dimensional features during nighttime (or in a low light environment) with illumination features activated in accordance with some implementations. In FIG. 19, nightlight-3D-stuffed-animal-with pockets (e.g., 1802) are shown attached to pajamas. The nightlight stuffed animal/shape 1802 can provide light 1804. The light can be a battery powered light (e.g., an LED light source), a glow in the dark light source, or an electro chemical light source (e.g., electroluminescent light source). The light source can be placed within the stuffed animal or shape. In addition to the pajamas, a blanket (e.g., 1600) can include pockets and 3D creatures/illuminated animals. The sleeves and cuffs of the pajamas and pant legs (or nightgown dress part), and various parts of the pajamas themselves, can also illuminate with a glow in the dark light source or other light source that is safe for children's clothing and/or pajamas. In Some implementations, the light source is manually activated via a button or switch. In other implementations, the light source is automatically activated by ambient light (e.g., if the pajamas are in a dim or dark environment, the light sources may automatically activate in response to a low level of light being present).

Some implementations relate to children's clothing, primarily pajamas (and nightgowns), but not limited to pajamas. Some implementations include three dimensional creatures/dolls and stuffed animals attach to clothing via a hook and loop fastener material. The stuffed creatures/shapes can have storage pockets inside of them (e.g., to hold a child's glasses, toothbrush, treats or other fun items, etc.). The stuffed creatures/shapes (e.g., 1802) can illuminate at night to provide light 1804 and act as little safe, glow-in-the-dark nightlights for kids. These creatures 1704 are easily removable and can turn into the children's stuffed animals, which they can cuddle with at night as well. The light source of the stuffed creatures/shapes 1702 and 1804.

In some implementations, the stuffed creatures can also match with the theme of the child's bedding (e.g., mermaid), as well as the bedroom decor, even match the story of an included storybook with the pajamas. The pajamas can match with included (or sold separately) matching bedtime CDs, pillow cases, toiletries, jewelry and accessories as well. Items such as a princess scepter, toy crowns, toy swords, necklaces/medallions, etc.). These accessories can be stored either in the pockets of the blankets themselves, and smaller items in the pockets of the creatures themselves that are within the pajamas.

The invention has thus been described in such clear and precise terms as to enable one of ordinary skill in the art to understand its fundamental principles. Additionally, numerous modifications are possible from the teaching disclosed herein that do not depart from the spirit and scope of the invention and these would still be covered by the claims shown below.

What is claimed is:

1. An article of apparel, wherein the article comprises:
a body portion forming at least sleepwear, wherein the body portion comprises at least a head opening, a plurality of arm openings or sleeves, and an exterior surface;
an illumination source disposed on an interior surface of the plurality of arm openings or sleeves of the apparel, wherein the illumination source emits light through the plurality of arm openings or sleeves of the apparel;
a plurality of fasteners disposed on the exterior surface of the sleepwear; and
one or more stuffed three dimensional animals or shapes constructed to be removably attachable to the fasteners disposed on the sleepwear.

2. The apparel of claim 1, wherein a light source is disposed in the one or more stuffed, three-dimensional animals or shapes.

3. The apparel of claim 2, wherein the light source includes an electrical light, an electro chemical light, glow in the dark material, or a combination thereof.

4. The apparel of claim 1, wherein the fastener is a hook and loop fastener.

5. The apparel of claim 1, further comprising a zipper disposed on the body portion and adapted to facilitate entry into the sleepwear.

6. The apparel of claim 1, further comprising a plurality of pant legs disposed opposite the head opening of the sleepwear.

7. The apparel of claim 1, wherein the illumination source is an electrical light, an electro chemical light, glow-in-the-dark material, or glow ring.

8. The apparel of claim 7, wherein the illumination source is removably disposed to the sleeve using a fastener, wherein the fastener is a hook and loop fastener.

9. The apparel of claim 1, further comprising an opening for a user's body disposed opposite the head opening.

10. The apparel of claim 1, wherein the one or more stuffed three dimensional animals or shapes further comprises a pocket disposed in the one or more stuffed three dimensional animals or shapes and disposed in the one or more stuffed three dimensional animals or shapes to obscure the opening of the pocket.

* * * * *